(12) United States Patent
Hirata et al.

(10) Patent No.: US 12,038,574 B2
(45) Date of Patent: Jul. 16, 2024

(54) MEMS MIRROR DEVICE AND METHOD OF MANUFACTURING THE SAME

(71) Applicant: Mitsubishi Electric Corporation, Tokyo (JP)

(72) Inventors: Yoshiaki Hirata, Tokyo (JP); Nobuaki Konno, Tokyo (JP); Takahiko Ito, Tokyo (JP); Yoshitaka Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 645 days.

(21) Appl. No.: 17/299,312

(22) PCT Filed: Feb. 6, 2019

(86) PCT No.: PCT/JP2019/004273
§ 371 (c)(1),
(2) Date: Jun. 3, 2021

(87) PCT Pub. No.: WO2020/161836
PCT Pub. Date: Aug. 13, 2020

(65) Prior Publication Data
US 2022/0057625 A1 Feb. 24, 2022

(51) Int. Cl.
G02B 26/08 (2006.01)
G02B 26/10 (2006.01)

(52) U.S. Cl.
CPC ....... *G02B 26/0833* (2013.01); *G02B 26/105* (2013.01)

(58) Field of Classification Search
None
See application file for complete search history.

(56) References Cited

U.S. PATENT DOCUMENTS

| 5,606,447 | A | 2/1997 | Asada et al. |
| 6,147,790 | A | 11/2000 | Meier et al. |
| 2002/0122238 | A1 | 9/2002 | Knipe |

(Continued)

FOREIGN PATENT DOCUMENTS

| JP | 2722314 B2 | 3/1998 |
| JP | 2000-28937 A | 1/2000 |
| JP | 2003-270555 A | 9/2003 |

(Continued)

OTHER PUBLICATIONS

International Search Report and Written Opinion mailed on Apr. 23, 2019, received for PCT Application PCT/JP2019/004273, Filed on Feb. 6, 2019, 11 pages including English Translation.

*Primary Examiner* — Jennifer D. Carruth
(74) *Attorney, Agent, or Firm* — XSENSUS LLP

(57) ABSTRACT

A MEMS mirror device includes a frame body (an outer movable frame body), an inner movable member, a first beam, a reflective mirror member, and a coupling member. The inner movable member is disposed inside the frame body. The first beam couples the inner movable member rotatably to the frame body. The reflective mirror member has a reflective surface and a rear surface. The coupling member couples the reflective mirror member and the inner movable member. The first beam is coupled to the inner movable member at the rear surface of the reflective mirror member. The MEMS mirror device may be reduced in size.

13 Claims, 36 Drawing Sheets

(56) References Cited

U.S. PATENT DOCUMENTS

2014/0368892 A1    12/2014  Mizoguchi
2016/0238390 A1*    8/2016  Yu ...................... B81C 1/00531

FOREIGN PATENT DOCUMENTS

| JP | 2014-191009 A | 10/2014 |
| JP | 2014-238581 A | 12/2014 |
| JP | 2014-240911 A | 12/2014 |
| JP | 2015-1543 A   | 1/2015  |

* cited by examiner

# MEMS MIRROR DEVICE AND METHOD OF MANUFACTURING THE SAME

CROSS-REFERENCE TO RELATED APPLICATION

The present application is based on PCT filing PCI/JP2019/004273, filed Feb. 6, 2019, the entire contents of which are incorporated herein by reference.

TECHNICAL FIELD

The present invention relates to a MEMS minor device and a method of manufacturing the MEMS mirror device.

BACKGROUND ART

Japanese Patent Laying-Open No. 2003-270555 (PTL 1) discloses an optical scanning apparatus including a planar-type actuator. The optical scanning apparatus includes a fixed portion, an outer torsion bar, an outer movable plate, an inner torsion bar, an inner movable plate, a reflective mirror, and driving means. The outer movable plate is coupled to the fixed portion with the outer torsion bar interposed therebetween. The inner movable plate is coupled to the outer movable plate with the inner torsion bar interposed therebetween. The reflective mirror is provided on the inner movable plate. The driving means drives the outer movable plate and the inner movable plate.

CITATION LIST

Patent Literature

PTL 1: Japanese Patent Laying-Open No. 2003-270555

SUMMARY OF INVENTION

Technical Problem

In the optical scanning apparatus disclosed in PTL 1, however, the inner torsion bar is connected to the outer peripheral edge of the inner movable plate corresponding to the outer peripheral edge of the reflective mirror. In order to ensure the area of the reflective mirror required for the optical scanning apparatus, the area of the inner movable plate needs to be increased. As a result, the optical scanning apparatus is increased in size. The present invention has been made in consideration of the above-described problems. An object of the present invention is to provide a MEMS mirror device that can be reduced in size and a method of manufacturing the MEMS mirror device.

Solution to Problem

A MEMS mirror device according to the present invention includes a frame body, an inner movable member, a first beam, a reflective mirror member, and a coupling member. The inner movable member is disposed inside the frame body. The first beam couples the inner movable member rotatably to the frame body. The reflective mirror member has a reflective surface and a rear surface opposite to the reflective surface. The coupling member couples the reflective mirror member and the inner movable member. The first beam is coupled to the inner movable member at the rear surface of the reflective mirror member.

Advantageous Effects of Invention

In the MEMS mirror device of the present invention, the first beam is coupled to the inner movable member at the rear surface of the reflective mirror member. Thus, the area of the reflective surface can be ensured without increasing the size of the inner movable member. The MEMS mirror device of the present invention may be reduced in size.

DESCRIPTION OF EMBODIMENTS

Figure 1:
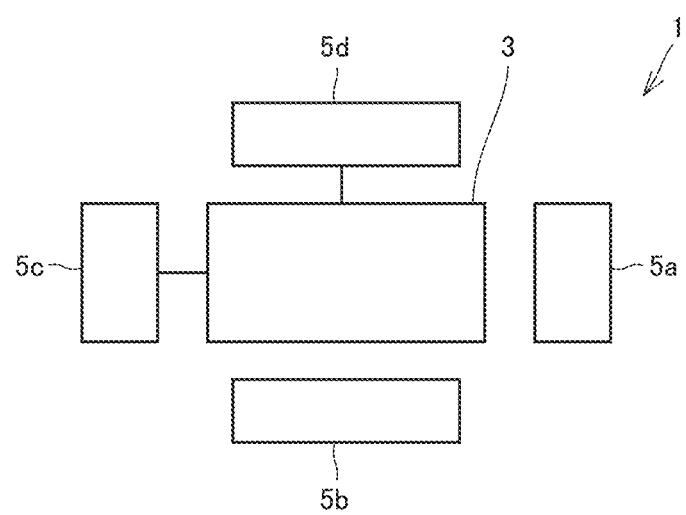
FIG. 1 is a schematic diagram of an optical scanning apparatus according to the first embodiment.

The following describes embodiments of the present invention, in which the same configurations are denoted by the same reference characters, and description thereof will not be repeated.

First Embodiment

Referring to FIG. 1, an optical scanning apparatus 1 according to the first embodiment will be hereinafter described. Optical scanning apparatus 1 according to the present embodiment includes a micro electro mechanical system (MEMS) mirror device 3, a first magnetic field generator 5a, a second magnetic field generator 5b, a first alternating-current (AC) current source 5c, and a second AC current source 5d. First magnetic field generator 5a, second magnetic field generator 5b, first AC current source 5c, and second AC current source 5d function as a drive unit of MEMS mirror device 3.

First magnetic field generator 5a is configured to apply a first magnetic field 61 (see FIG. 10) in the first direction (the x direction) to MEMS mirror device 3. First magnetic field generator 5a is a permanent magnet, for example. Second magnetic field generator 5b is configured to apply a second magnetic field 62 (see FIG. 10) in the second direction (the y direction) to MEMS mirror device 3. Second magnetic field generator 5b is a permanent magnet, for example. The second direction (the y direction) is different from the first direction (the x direction). Specifically, the second direction (the y direction) is perpendicular to the first direction (the x direction). A reflective surface 30r (see FIG. 3 and the like), which will be described later, extends in the first direction (the x direction) and the second direction (the y direction). First AC current source 5c is configured to supply a first AC current to a first coil 25 (see FIGS. 2 and 4, and the like), which will be described later. Second AC current source 5d is configured to supply a second AC current to a second coil 15 (see FIGS. 2, 4, and the like), which will be described later.

Referring to FIGS. 2 to 14, MEMS mirror device 3 according to the first embodiment will be hereinafter described. MEMS mirror device 3 includes a frame body (an outer movable frame body 13), an inner movable member 23, a first beam 21, a reflective mirror member 30, and a coupling member 40 (see FIG. 6). MEMS mirror device 3 further includes a fixed frame body 7 and a second beam 11. MEMS mirror device 3 further includes a first rib 43. MEMS mirror device 3 further includes second ribs 41 and 42. MEMS mirror device 3 is mounted on a package 8 having an opening 8a.

MEMS mirror device 3 has a stack structure including a first silicon layer 51, a second silicon layer 52, and a third silicon layer 53. Second silicon layer 52 is stacked between first silicon layer 51 and third silicon layer 53. For example, first silicon layer 51, second silicon layer 52, and third silicon layer 53 are stacked in the third direction (the z direction). The third direction (the z direction) is, for example, perpendicular to the first direction (the x direction) and the second direction (the y direction).

Specifically, the stack structure includes an insulating layer 55, an insulating layer 56, and an insulating layer 57.

First silicon layer 51 and second silicon layer 52 are stacked on one another with insulating layer 55 interposed therebetween. First silicon layer 51, insulating layer 55, and second silicon layer 52 constitute a first SOI wafer 50. Second silicon layer 52 and third silicon layer 53 are stacked on one another with insulating layer 57 interposed therebetween. Insulating layer 56 is formed on the rear surface of first silicon layer 51. First silicon layer 51 may be thinner than second silicon layer 52. First silicon layer 51 has a thickness equal to or greater than 10 µm and equal to or less than 100 µm, for example. Second silicon layer 52 has a thickness greater than 100 µm and equal to or less than 700 µm, for example.

Figure 8:
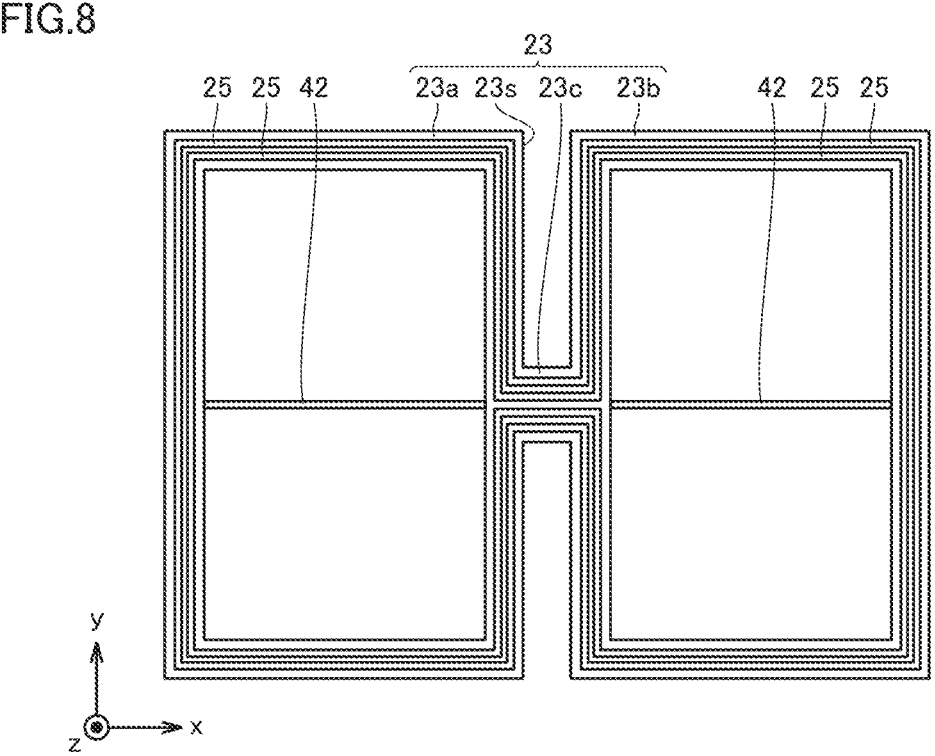
FIG. 8 is a schematic rear view of an inner movable member included in the optical scanning apparatus according to the first embodiment.

Inner movable member 23 is disposed inside the opening of the frame body (outer movable frame body 13). As shown in FIG. 8, inner movable member 23 includes a first frame body portion 23a, a second frame body portion 23b, and a coupling portion 23c. Coupling portion 23c couples first frame body portion 23a and second frame body portion 23b. Inner movable member 23 is provided with a slot 23s. Slot 23s is a gap between first frame body portion 23a and second frame body portion 23b. Slot 23s is a recessed portion of inner movable member 23 that is defined by first frame body portion 23a, second frame body portion 23b, and coupling portion 23c. Slot 23s is an elongated gap or recessed portion extending in the second direction (the y direction). Inner movable member 23 is formed in first silicon layer 51. Inner movable member 23 may include insulating layer 55 and insulating layer 56.

As shown in FIGS. 2, 4 and 6 to 8, a first coil 25 is provided on the rear surface of inner movable member 23. The rear surface of inner movable member 23 is the surface of inner movable member 23 that is distal from reflective mirror member 30. First coil 25 is a thin film coil, for example. First coil 25 is formed of a conductive material such as copper, gold, silver, or aluminum. Specifically, first coil 25 is provided on insulating layer 56. Insulating layer 56 electrically insulates first coil 25 from first silicon layer 51. First coil 25 is electrically connected to first AC current source 5c (see FIG. 1). The first AC current supplied from first AC current source 5c flows through first coil 25.

In the present embodiment, the frame body is outer movable frame body 13. Outer movable frame body 13, inner movable member 23 are disposed inside an opening 7a of fixed frame body 7. The frame body (outer movable frame body 13) is formed in first silicon layer 51. The frame body (outer movable frame body 13) includes insulating layer 55 and insulating layer 56.

As shown in FIGS. 2, 4, 6, and 7, second coil 15 is provided on the rear surface of outer movable frame body 13. The rear surface of outer movable frame body 13 is the surface of outer movable frame body 13 that is distal from reflective mirror member 30. Second coil 15 is a thin film coil, for example. Second coil 15 is formed of a conductive material such as copper, gold, silver, or aluminum. Specifically, second coil 15 is provided on insulating layer 56. Insulating layer 56 electrically insulates second coil 15 from first silicon layer 51. Second coil 15 is electrically connected to second AC current source 5d (see FIG. 1). The second AC current supplied from second AC current source 5d flows through second coil 15.

Figure 4:
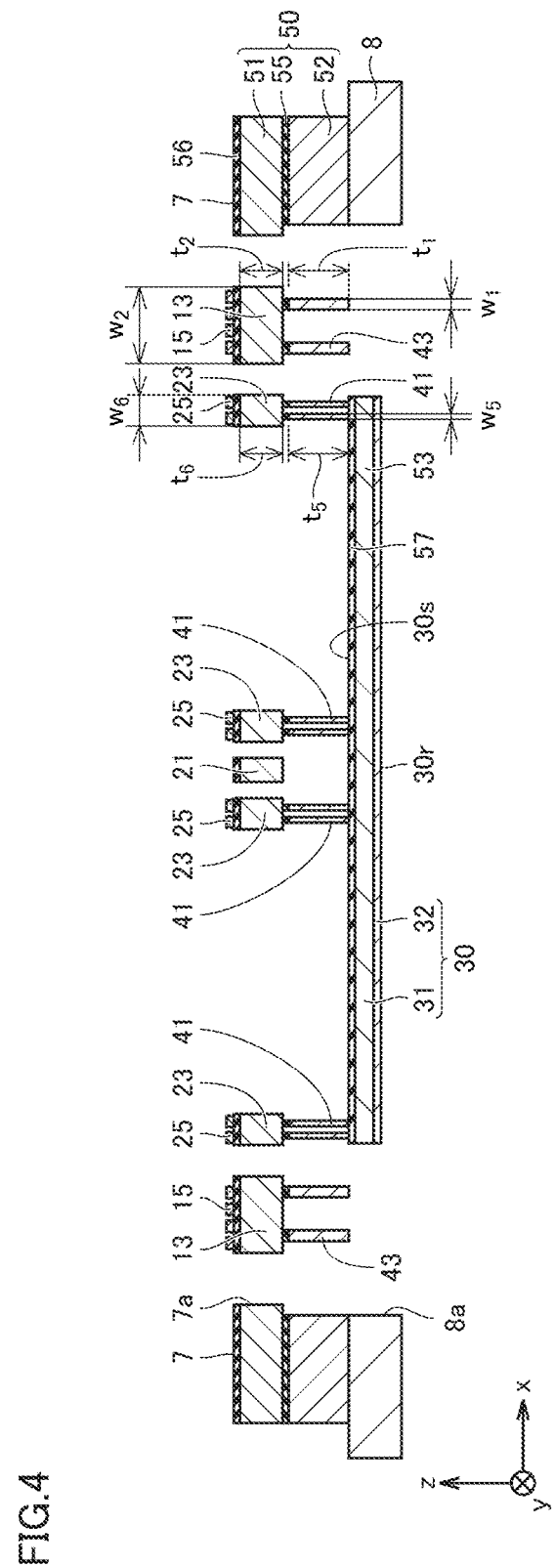
FIG. 4 is a schematic cross-sectional view of the MEMS mirror device according to the first embodiment, which is taken along a section line IV-IV shown in FIG. 2.
Figure 6:
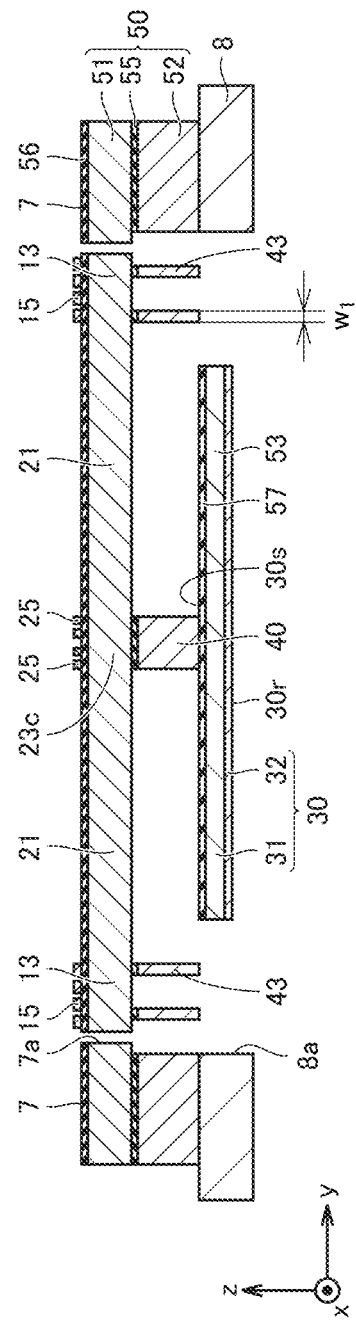
FIG. 6 is a schematic cross-sectional view of the MEMS mirror device according to the first embodiment, which is taken along a section line VI-VI shown in FIG. 2.
Figure 7:
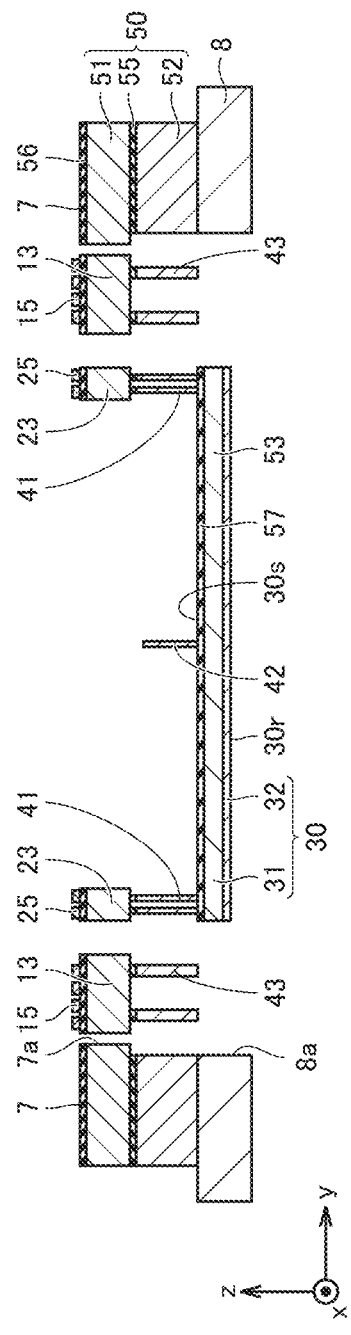
FIG. 7 is a schematic cross-sectional view of the MEMS mirror device according to the first embodiment, which is taken along a section line VII-VII shown in FIG. 2.

As shown in FIGS. 4, 6 and 7, first rib 43 is provided in outer movable frame body 13. As shown in FIG. 7, first rib 43 protrudes from the front surface of outer movable frame body 13. The front surface of outer movable frame body 13 is the surface of outer movable frame body 13 that is proximal to reflective mirror member 30. First rib 43 is spaced apart from reflective mirror member 30. First rib 43 enhances the rigidity of outer movable frame body 13, to thereby prevent outer movable frame body 13 from becoming distorted in its out-of-plane direction when outer movable frame body 13 vibrates rotationally about second beam 11. The second electromagnetic force generated by second magnetic field 62 and the second AC current may be efficiently converted into a rotational vibrating motion of outer movable frame body 13. A width $w_1$ of first rib 43 is smaller than the width of coupling member 40. Width $w_1$ of first rib 43 is smaller than a width $w_2$ of outer movable frame body 13. A thickness $t_1$ of first rib 43 may be greater than a thickness $t_2$ of outer movable frame body 13. First rib 43 is formed in second silicon layer 52.

Figure 2:
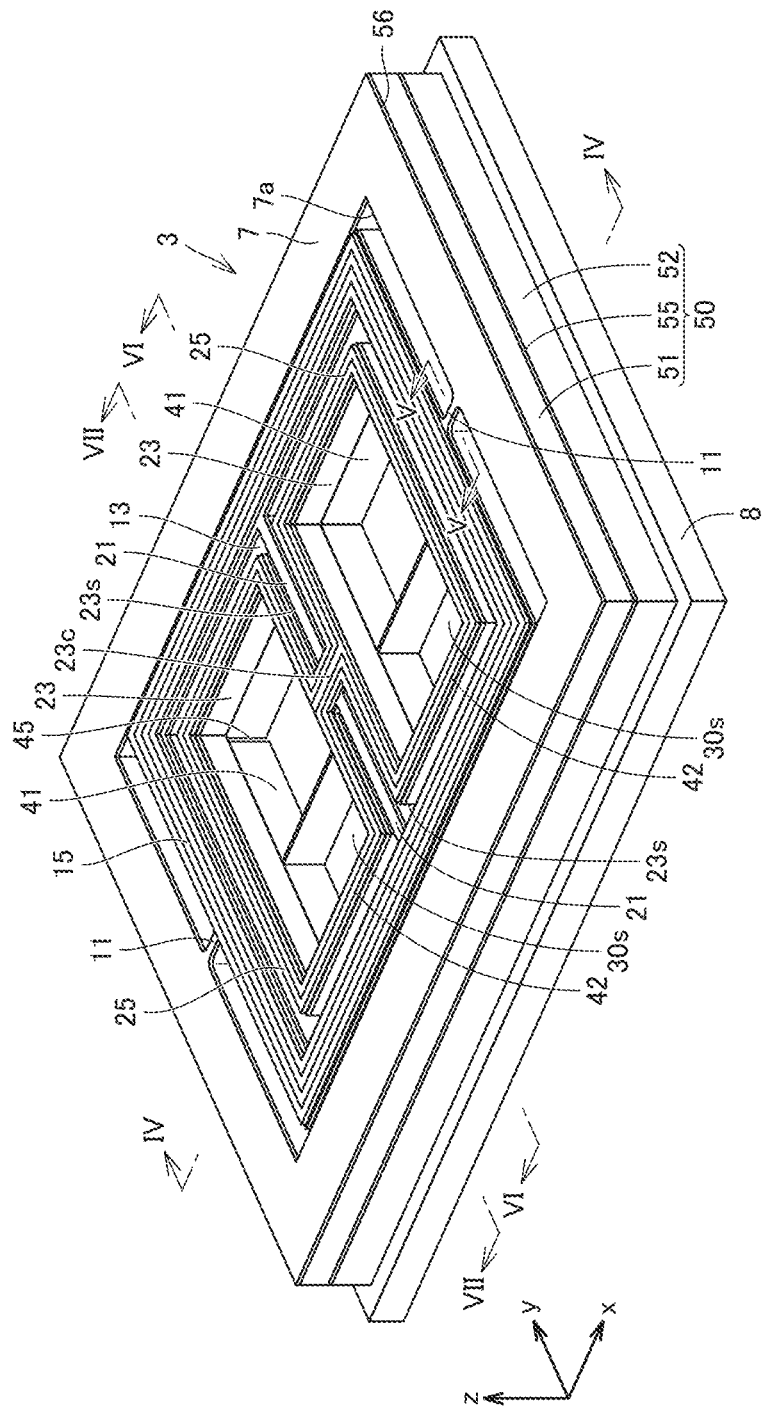
FIG. 2 is a schematic rear perspective view of a MEMS mirror device according to the first embodiment.

As shown in FIGS. 2 and 6, first beam 21 couples inner movable member 23 rotatably to the frame body (outer movable frame body 13). First beam 21 is coupled to inner movable member 23 at a rear surface 30s of reflective mirror member 30. In a plan view of reflective surface 30r of reflective mirror member 30, an end portion of first beam 21 that is coupled to inner movable member 23 overlaps with reflective mirror member 30. Specifically, first beam 21 is coupled to inner movable member 23 at a central portion of rear surface 30s of reflective mirror member 30. First beam 21 is coupled to coupling portion 23c of inner movable member 23. First beam 21 extends through slot 23s. First beam 21 extends in the second direction (the y direction). First beam 21 is formed in first silicon layer 51. First beam 21 includes insulating layer 55. First beam 21 may include insulating layer 56.

Figure 3:
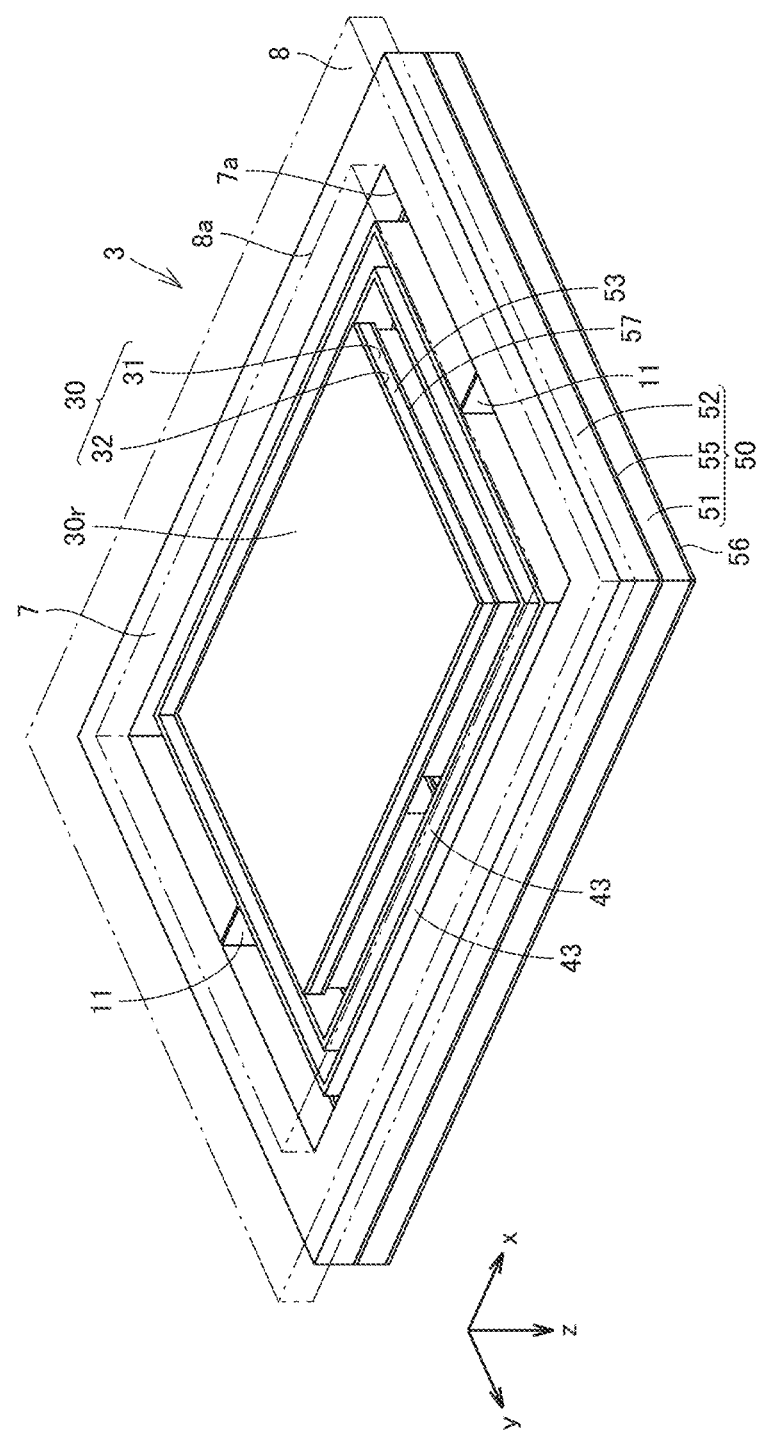
FIG. 3 is a schematic front perspective view of the MEMS mirror device according to the first embodiment.

As shown in FIGS. 2 and 3, fixed frame body 7 is fixed to package 8. Fixed frame body 7 is formed in first silicon layer 51 and second silicon layer 52. Fixed frame body 7 includes insulating layer 55. Fixed frame body 7 may include insulating layer 56.

Figure 5:
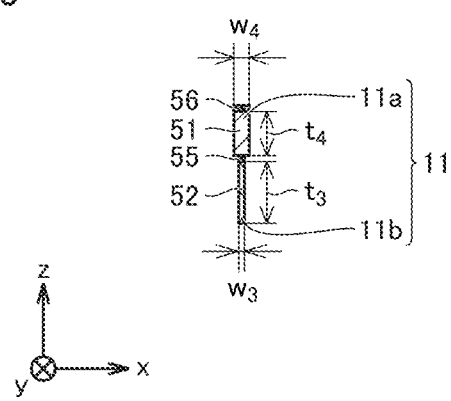
FIG. 5 is a schematic cross-sectional view of the MEMS mirror device according to the first embodiment, which is taken along a section line V-V shown in FIG. 2.

As shown in FIGS. 2, 3 and 5, second beam 11 couples the frame body (outer movable frame body 13) rotatably to fixed frame body 7. In a plan view of reflective surface 30r of reflective mirror member 30, second beam 11 extends in a direction different from the direction in which first beam 21 extends. Specifically, second beam 11 extends in the first direction (the x direction) perpendicular to the second direction (they direction) in which first beam 21 extends.

Second beam 11 includes: a first layer 11a connected to outer movable frame body 13 and fixed frame body 7; and a second layer 11b stacked on first layer 11a. Second layer 11b is separated from outer movable frame body 13 and fixed frame body 7. A thickness $t_3$ of second layer 11b is larger than a thickness $t_4$ of first layer 11a. A width $w_3$ of second layer 11b is smaller than a width $w_4$ of first layer 11a. Second beam 11 is formed in first silicon layer 51 and second silicon layer 52. First layer 11a is formed in first silicon layer 51. Second layer 11b is formed in second silicon layer 52. Second beam 11 includes insulating layer 55. Second beam 11 may include insulating layer 56.

As shown in FIGS. 3, 4, 6, and 7, reflective mirror member 30 has reflective surface 30r and rear surface 30s opposite to reflective surface 30r. Reflective mirror member 30 includes a base member 31 and a reflective layer 32 provided on the front surface of base member 31. Reflective surface 30r of reflective mirror member 30 is the surface of reflective layer 32. Reflective layer 32 is formed of a material having high reflectivity, such as gold, silver, or aluminum. Reflective mirror member 30 (base member 31) includes third silicon layer 53. Reflective mirror member 30 (base member 31) is formed in third silicon layer 53. Reflective mirror member 30 may include insulating layer 57 on the rear surface of base member 31 opposite to the front surface of base member 31.

Metal layers (for example, first coil 25 and second coil 15) other than reflective layer 32 are not provided on the front surface of base member 31. Thus, the metal layers other than reflective layer 32 (for example, first coil 25 and second coil 15) prevent the light incident upon reflective layer 32 and the light reflected from reflective layer 32 from being blocked. Further, since stress is not applied to reflective mirror member 30 from the metal layers other than reflective layer 32, reflective mirror member 30 is prevented from becoming distorted in its out-of-plane direction. MEMS mirror device 3 can scan the light incident upon reflective mirror member 30 in an appropriate direction. In the present specification, the out-of-plane direction of reflective mirror member 30 means the thickness direction of reflective mirror member 30.

As shown in FIG. 6, reflective mirror member 30 is supported by inner movable member 23. Specifically, reflective mirror member 30 is coupled to inner movable member 23 by coupling member 40. Thus, when inner movable member 23 vibrates rotationally about first beam 21, reflective mirror member 30 vibrates rotationally together with inner movable member 23. The light is scanned by the rotational vibration of reflective mirror member 30. Coupling member 40 is formed in second silicon layer 52.

Figure 9:
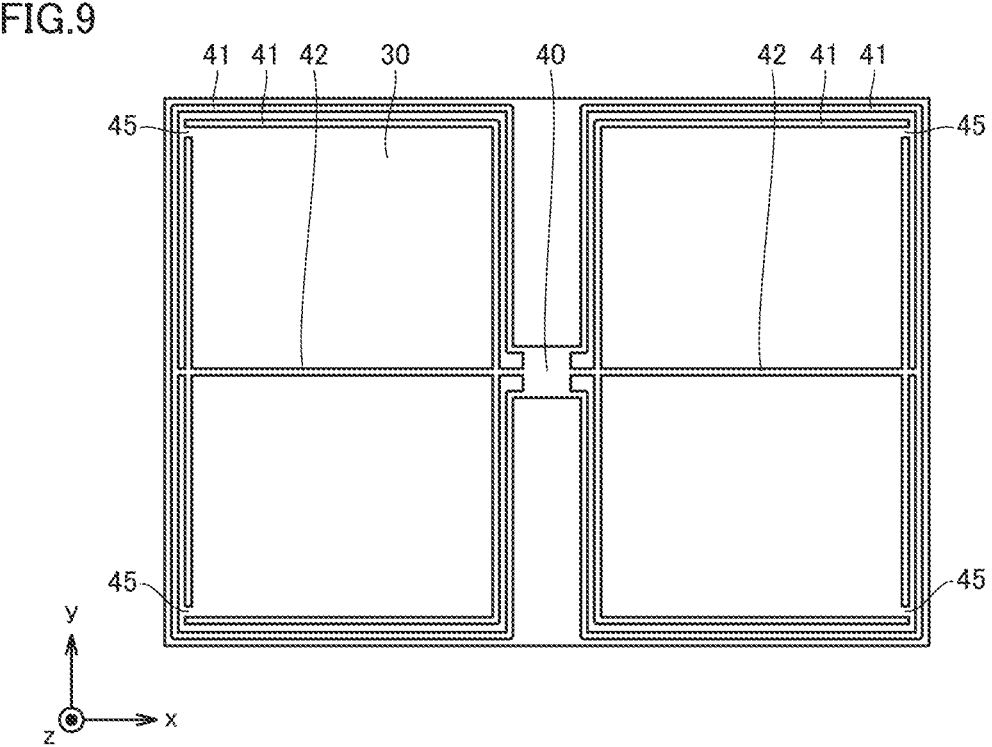
FIG. 9 is a schematic rear view of a reflective mirror member included in the optical scanning apparatus according to the first embodiment.

As shown in FIGS. 4, 7 and 9, second ribs 41 and 42 are provided in reflective mirror member 30 (base member 31). Second ribs 41 and 42 are provided at rear surface 30s of reflective mirror member 30 and protrude from rear surface 30s of reflective mirror member 30. Second rib 41 is connected to inner movable member 23 (first frame body portion 23a and second frame body portion 23b). Second rib 42 is spaced apart from inner movable member 23. Second ribs 41 and 42 are formed in second silicon layer 52. A width $w_5$ of each of second ribs 41 and 42 is smaller than a width $w_6$ of inner movable member 23. A thickness $t_5$ of each of second ribs 41 and 42 may be larger than a thickness $t_6$ of inner movable member 23. Width $w_5$ of each of second ribs 41 and 42 is smaller than the width of reflective mirror member 30. Thickness $t_5$ of each of second ribs 41 and 42 may be larger than the thickness of reflective mirror member 30.

As shown in FIG. 9, second ribs 41 and 42 may be connected to coupling member 40. Width $w_5$ of each of second ribs 41 and 42 is smaller than the width of coupling member 40. In a plan view of reflective surface 30r of reflective mirror member 30, second rib 41 is provided in an open loop shape. Specifically, second rib 41 extends along a portion of reflective mirror member 30 that faces first frame body portion 23a and second frame body portion 23b of inner movable member 23. A gap 45 is provided in at least a part of second rib 41.

Second rib 42 extends in the first direction (the x direction) perpendicular to the second direction (the y direction) in which first beam 21 extends. Second rib 42 is connected to the first portion of second rib 41 and the second portion of second rib 41. The first portion of second rib 41 faces first frame body portion 23a and second frame body portion 23b of inner movable member 23 and is provided on a portion of reflective mirror member 30 that is proximal to coupling member 40. The second portion of second rib 41 faces first frame body portion 23a and second frame body portion 23b of inner movable member 23 and is provided on the outer peripheral edge portion of reflective mirror member 30 that is distal from coupling member 40. Second rib 42 may be further connected to coupling member 40.

Referring to FIGS. 1 and 10 to 14, the operation of MEMS mirror device 3 will be hereinafter described.

Figure 10:
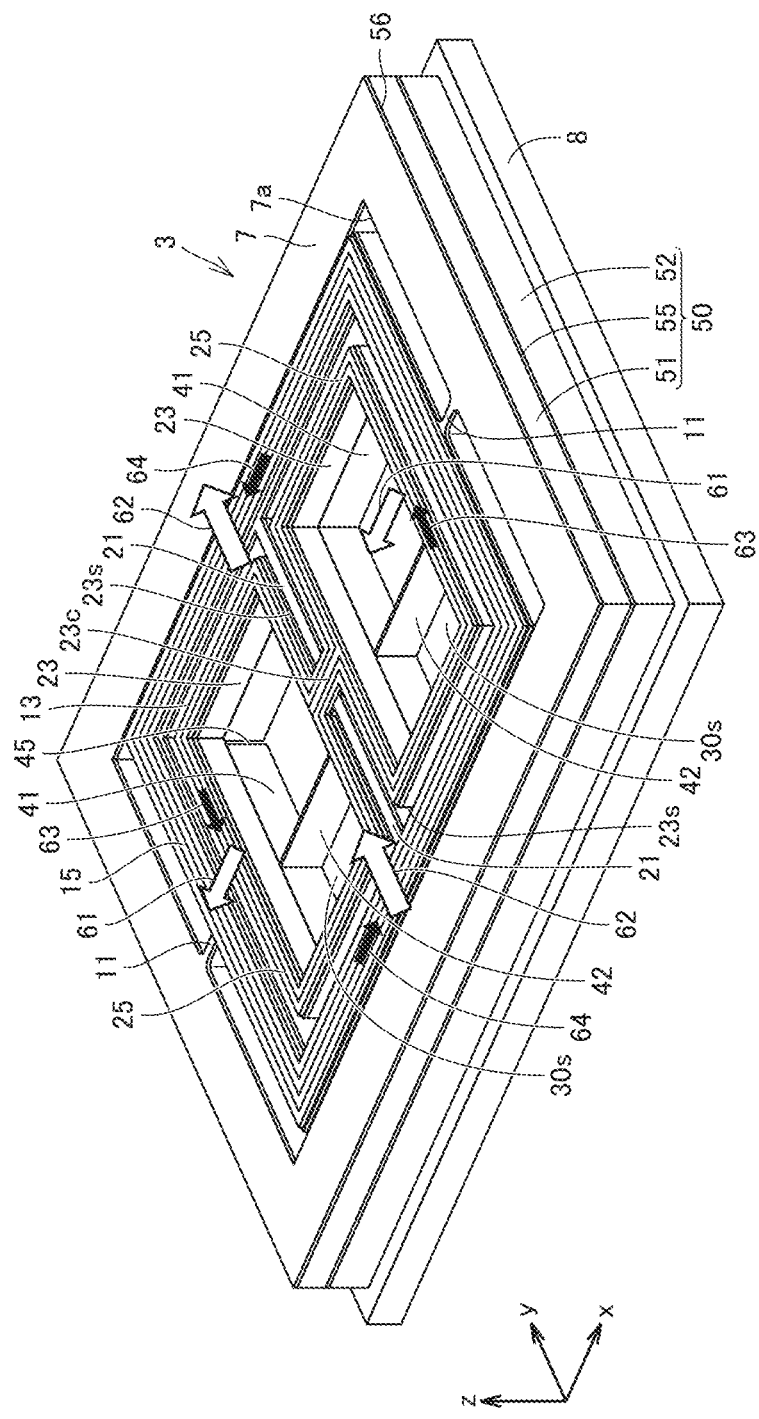
FIG. 10 is a schematic rear perspective view showing a driving principle of the MEMS mirror device according to the first embodiment.

As shown in FIGS. 1 and 10, first magnetic field generator 5a applies first magnetic field 61 in the first direction (the x direction) to MEMS mirror device 3. Second magnetic field generator 5b applies second magnetic field 62 in the second direction (the y direction) to MEMS mirror device 3.

Figure 11:
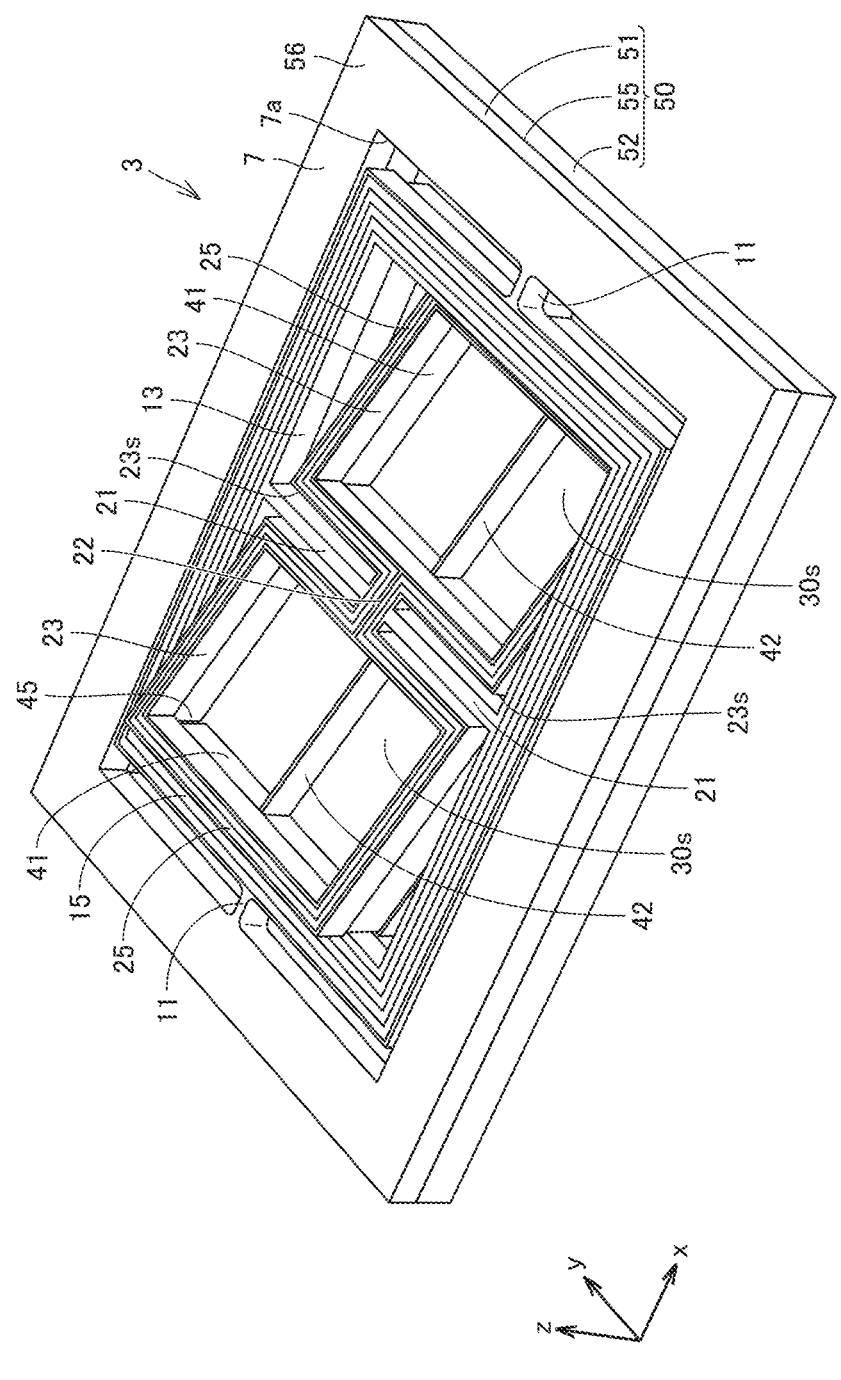
FIG. 11 is a schematic rear perspective view showing an operation state of the MEMS mirror device according to the first embodiment.
Figure 12:
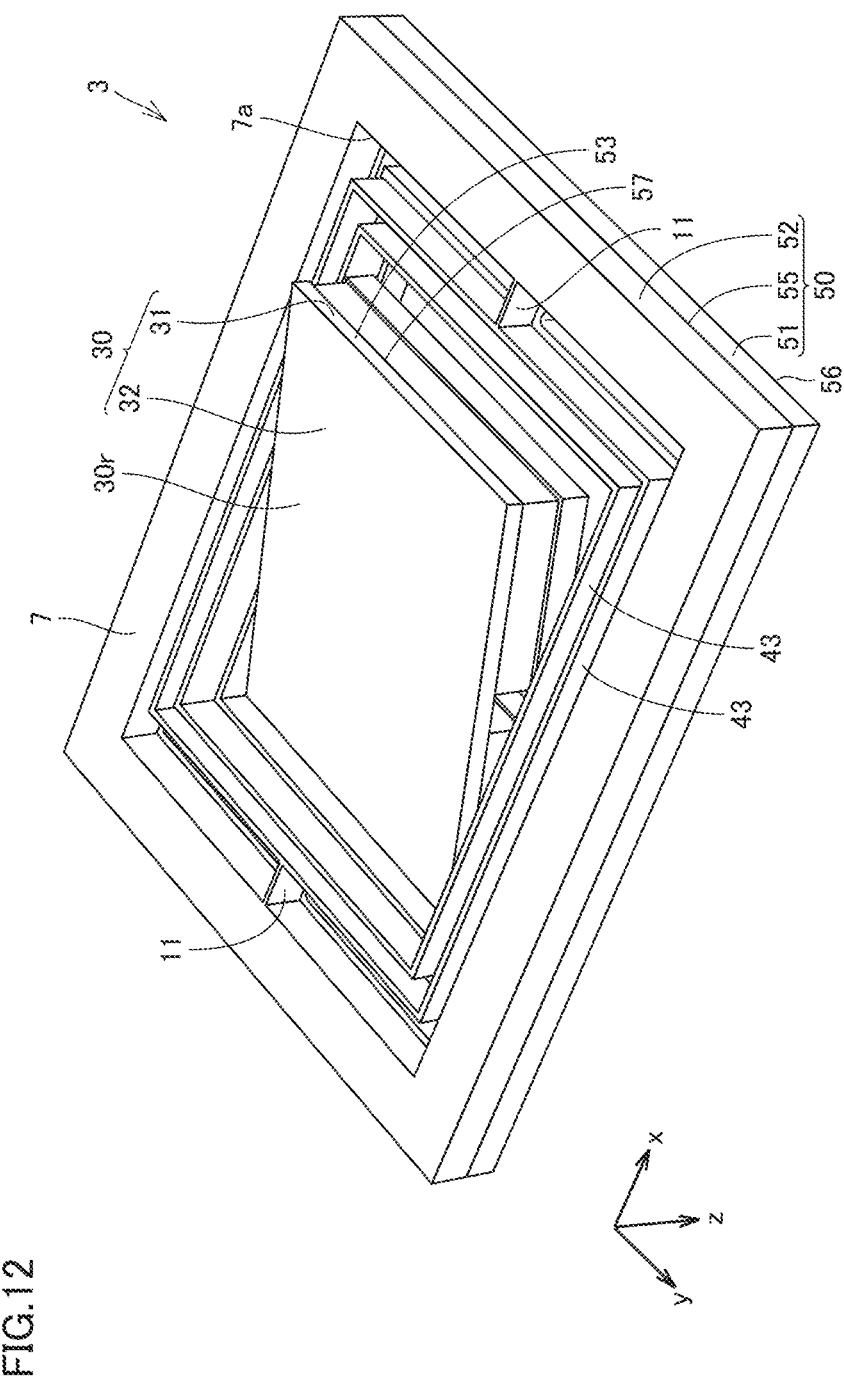
FIG. 12 is a schematic front perspective view showing an operation state of the MEMS mirror device according to the first embodiment.

First AC current source 5c supplies a first AC current to first coil 25. The first frequency of the first AC current is set to coincide with the resonance frequency of inner movable member 23. Thus, the deflection angle of reflective mirror member 30 can be increased with a relatively small first AC current, and reflective mirror member 30 can be operated at high speed. The first frequency is several hundred Hz or more and several kHz or less, for example. First magnetic field 61 and the first AC current generate the first electromagnetic force. As shown in FIGS. 11 and 12, the first electromagnetic force causes inner movable member 23 to vibrate rotationally about first beam 21. Reflective mirror member 30 supported by inner movable member 23 also vibrates rotationally about first beam 21. Reflective mirror member 30 that rotationally vibrates scans, in the first direction (the x direction), the light incident upon reflective mirror member 30 from opening 8a of package 8 and opening 7a of fixed frame body 7.

Figure 13:
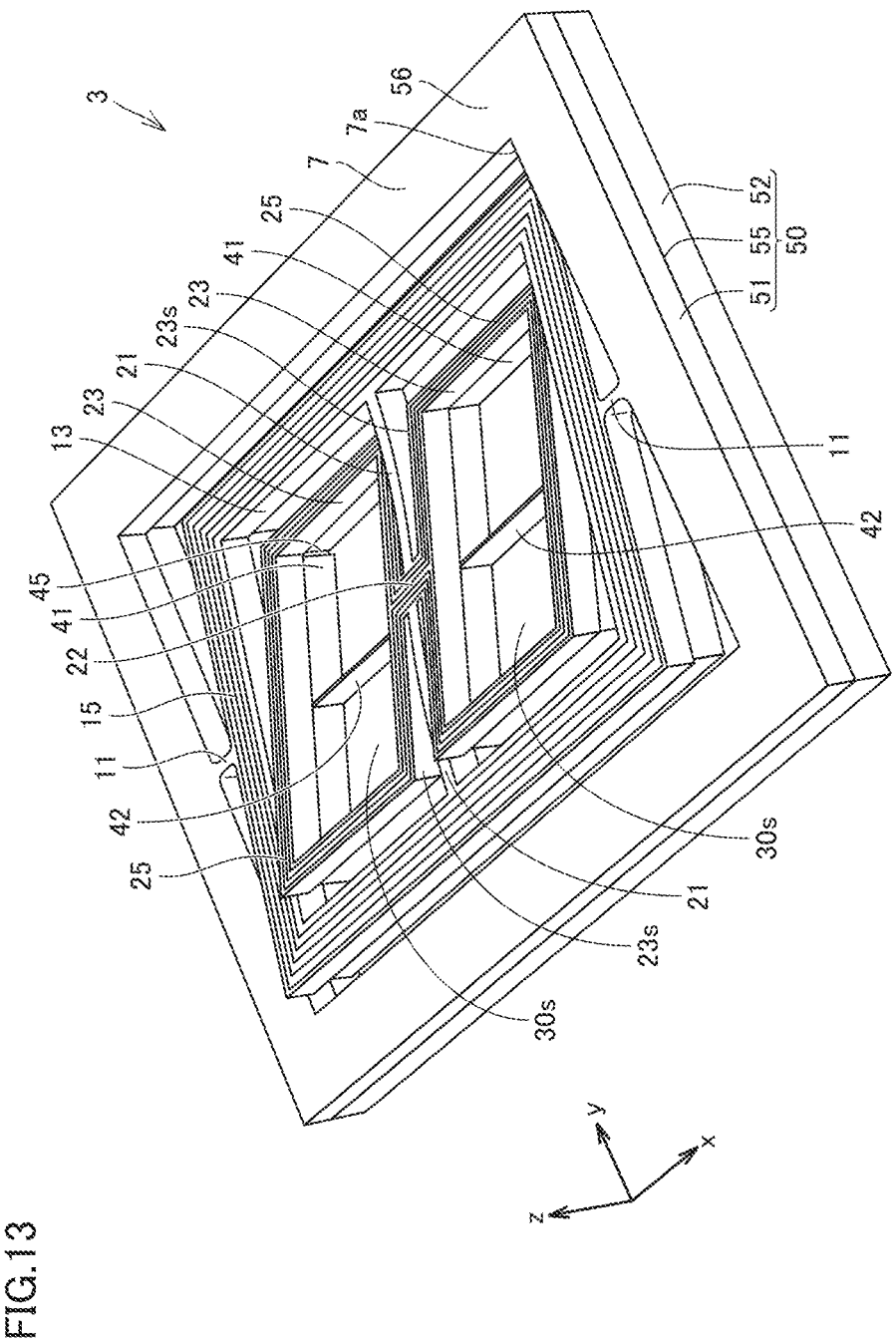
FIG. 13 is a schematic rear perspective view showing an operation state of the MEMS mirror device according to the first embodiment.
Figure 14:
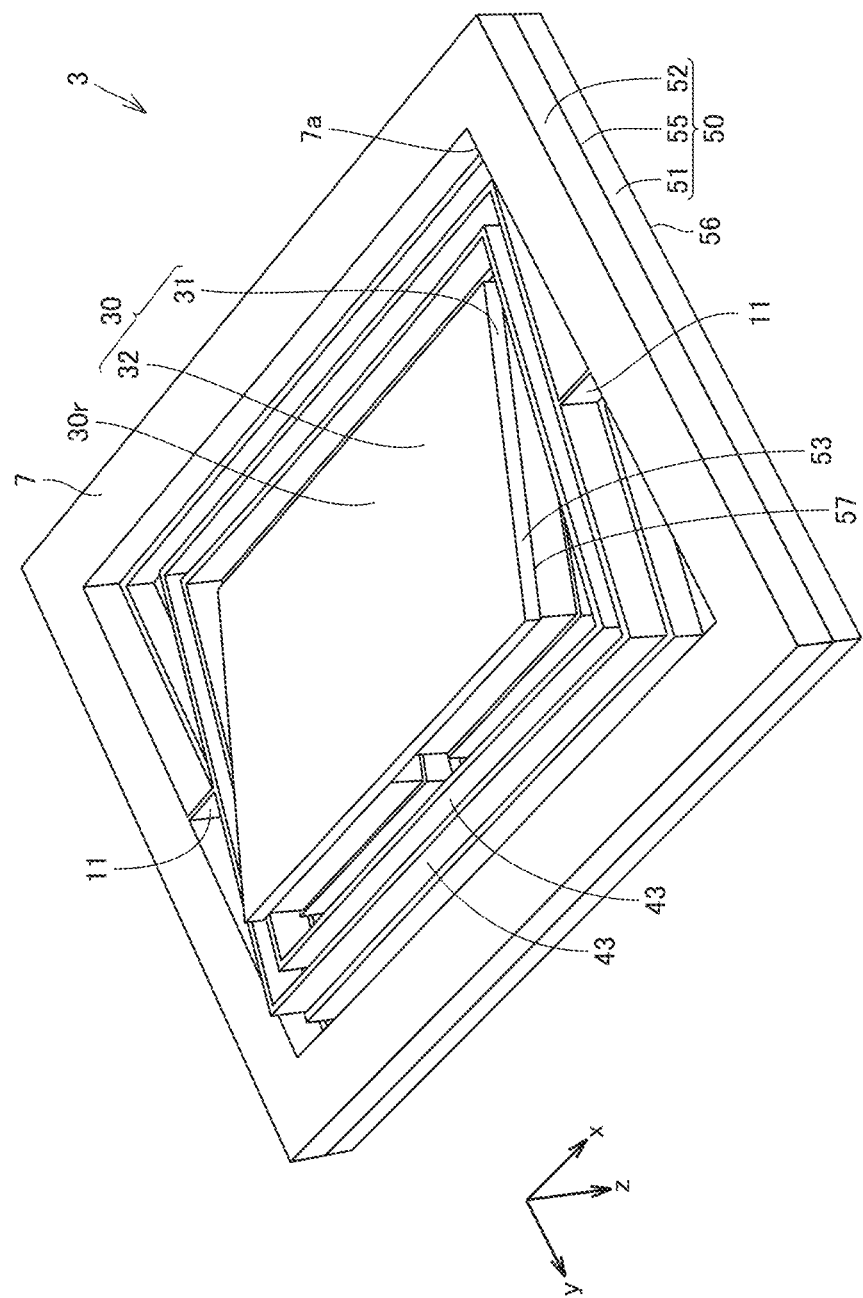
FIG. 14 is a schematic front perspective view showing an operation state of the MEMS mirror device according to the first embodiment.

Second AC current source 5d supplies a second AC current to second coil 15. The second frequency of the second AC current is set to be different from the resonance frequency of outer movable frame body 13. The second frequency of the second AC current is smaller than the first frequency of the first AC current. The second frequency is several Hz or more and several tens of Hz or less, for example. Second magnetic field 62 and the second AC current generate the second electromagnetic force. As shown in FIGS. 13 and 14, the second electromagnetic force causes outer movable frame body 13 to vibrate rotationally about second beam 11. Reflective mirror member 30 and inner movable member 23 supported by outer movable frame body 13 also vibrate rotationally about second beam 11. Reflective mirror member 30 that rotationally vibrates scans, in the second direction (the y direction), the light incident upon reflective mirror member 30 from opening 8a of package 8 and opening 7a of fixed frame body 7. Thus, optical scanning apparatus 1 two-dimensionally scans the light incident upon reflective mirror member 30.

Then, a method of manufacturing MEMS mirror device 3 of the present embodiment will be described with reference to FIGS. 15 to 24.

Figure 15:
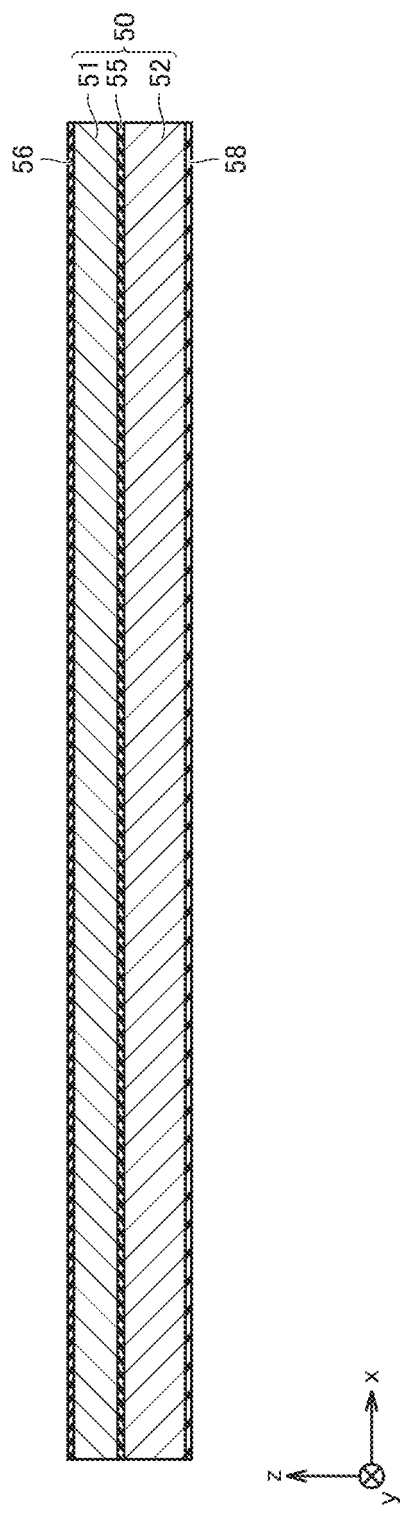
FIG. 15 is a schematic cross-sectional view showing a step of a method of manufacturing the MEMS mirror device according to the first embodiment.

As shown in FIG. 15, first SOI wafer 50 is prepared. First SOI wafer 50 includes first silicon layer 51, insulating layer 55, and second silicon layer 52. First silicon layer 51 and second silicon layer 52 are stacked on one another with insulating layer 55 interposed therebetween. Insulating layer 55 is a silicon dioxide ($SiO_2$) layer, for example. Insulating layer 56 is provided on the rear surface of first silicon layer 51 that is distal from second silicon layer 52. For example, the rear surface of first silicon layer 51 is thermally oxidized to form insulating layer 56. An insulating layer 58 is provided on the front surface of second silicon layer 52 that is distal from first silicon layer 51. For example, the front surface of second silicon layer 52 is thermally oxidized to form insulating layer 58. Each of insulating layer 56 and insulating layer 58 is a silicon dioxide ($SiO_2$) layer, for example.

Figure 16:
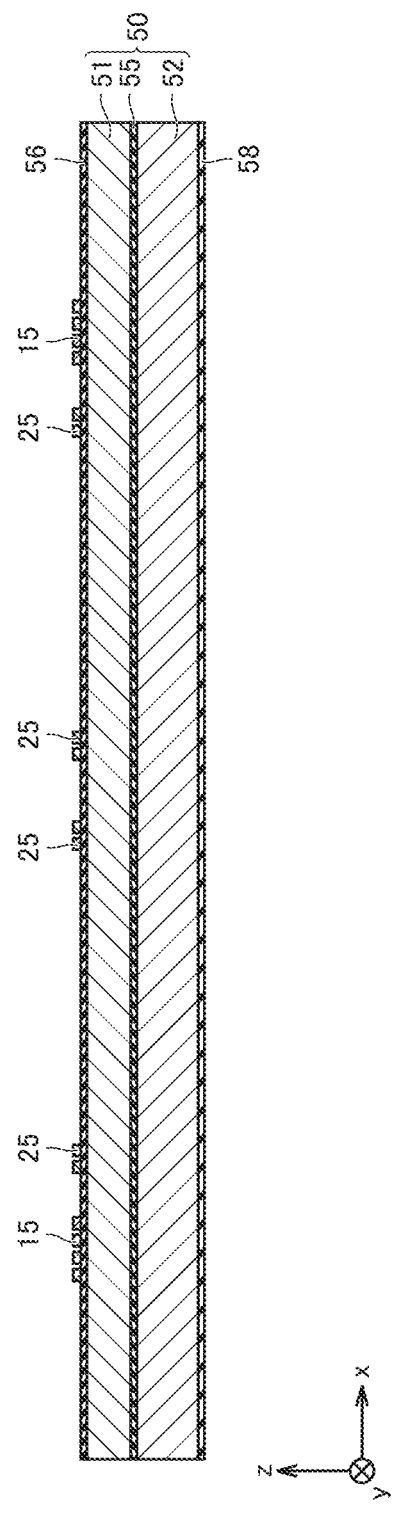
FIG. 16 is a schematic cross-sectional view showing a step subsequent to the step shown in FIG. 15 in the method of manufacturing the MEMS mirror device according to the first embodiment.

As shown in FIG. 16, first coil 25 and second coil 15 are provided on insulating layer 56. Each of first coil 25 and second coil 15 is a thin film coil, for example. First coil 25 and second coil 15 each are formed by vapor deposition of a conductive material such as copper, gold, silver, or aluminum on insulating layer 56. Insulating layer 56 electrically insulates first coil 25 and second coil 15 from first silicon layer 51.

Figure 17:
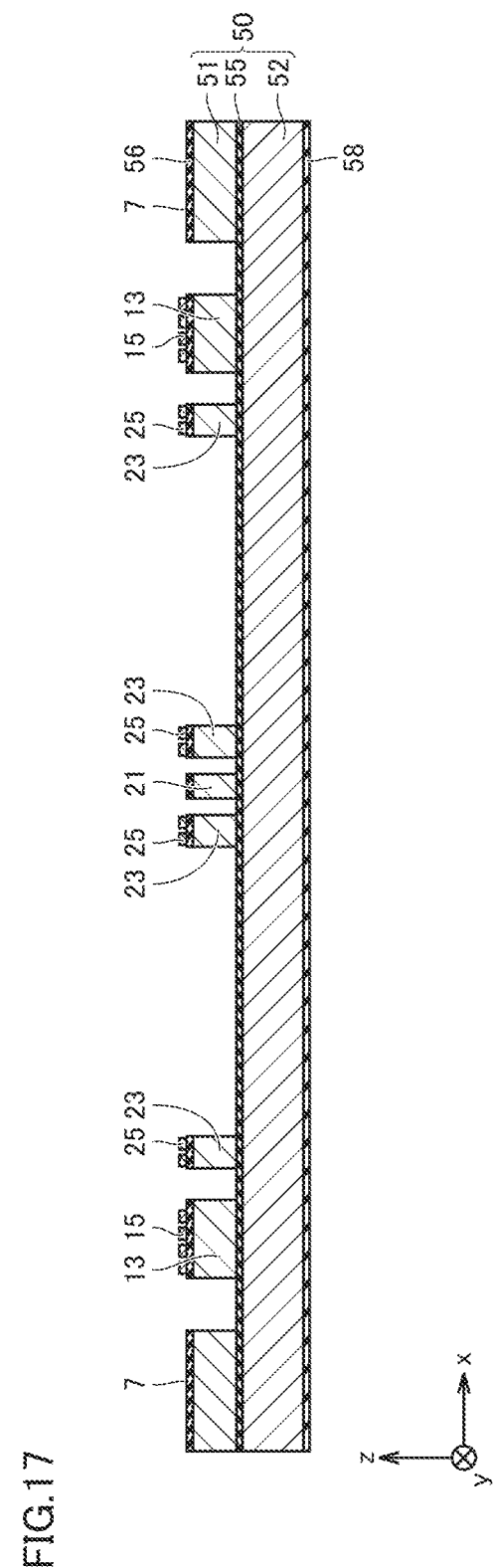
FIG. 17 is a schematic cross-sectional view showing a step subsequent to the step shown in FIG. 16 in the method of manufacturing the MEMS mirror device according to the first embodiment.

As shown in FIG. 17, insulating layer 56 and first silicon layer 51 each are partially removed to thereby form inner movable member 23, the frame body (outer movable frame body 13), first beam 21, second beam 11, and a part of fixed frame body 7 in first silicon layer 51. Specifically, the first mask (not shown) having an opening is formed on insulating layer 56, first coil 25, and second coil 15. Insulating layer 56 is partially etched using the first mask. Insulating layer 56 is selectively removed from first silicon layer 51, for example, by reactive ion etching (RIE) or etching using an etching solution such as hydrofluoric acid or etching gas such as hydrofluoric acid gas. Then, first silicon layer 51 is selectively etched using insulating layer 56 as a mask. First silicon layer 51 is etched by deep reactive ion etching (DRIE). Insulating layer 55 functions as an etching stopper for DRIE.

Figure 18:
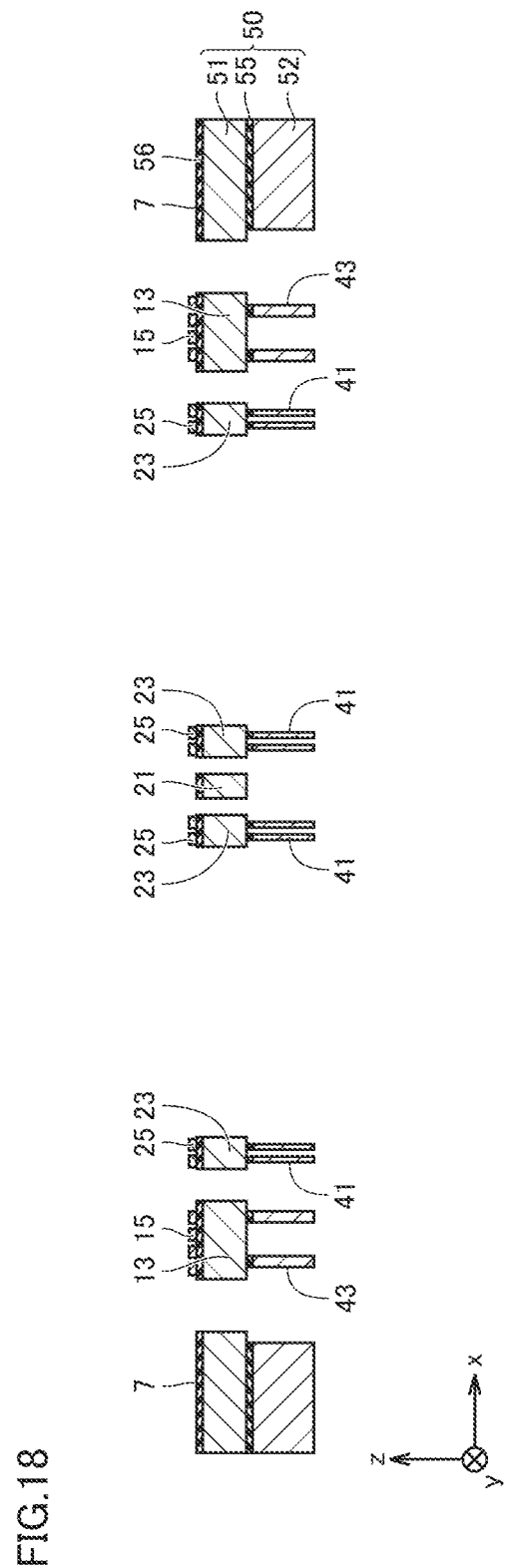
FIG. 18 is a schematic cross-sectional view showing a step subsequent to the step shown in FIG. 17 in the method of manufacturing the MEMS mirror device according to the first embodiment.
Figure 19:
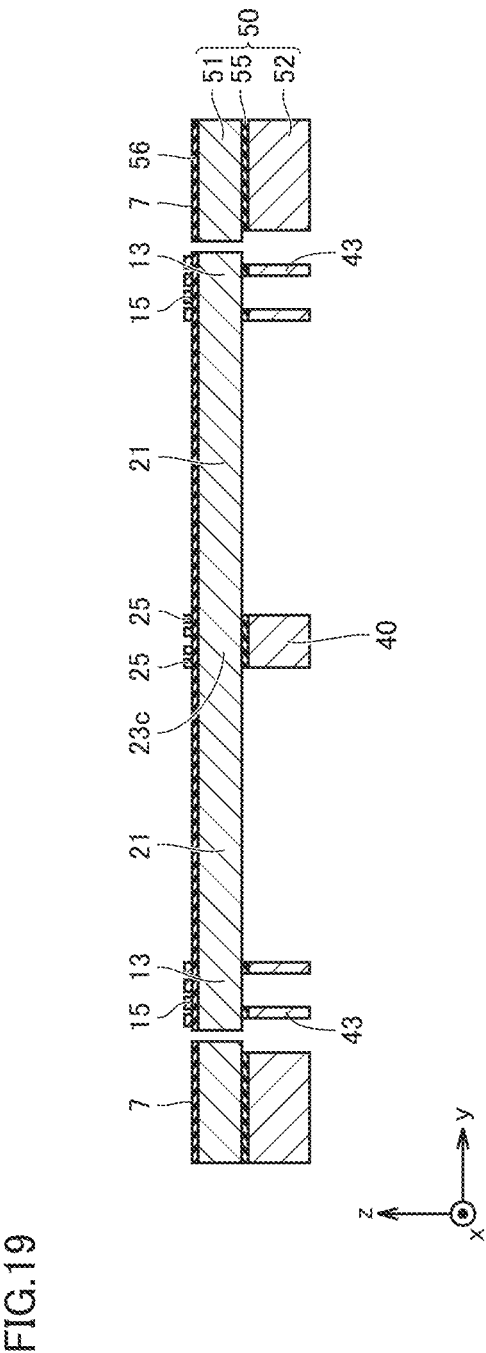
FIG. 19 is a schematic cross-sectional view showing a step subsequent to the step shown in FIG. 17 in the method of manufacturing the MEMS mirror device according to the first embodiment.

As shown in FIGS. 18 and 19, insulating layer 55 and second silicon layer 52 each are partially removed to thereby form coupling member 40, first rib 43, second ribs 41 and 42, and a part of fixed frame body 7 in second silicon layer 52. Specifically, insulating layer 55 exposed from the first mask is partially etched using the first mask (not shown) provided on insulating layer 56. Insulating layer 55 is selectively removed from first silicon layer 51, for example, by the method similar to that for insulating layer 56.

Then, the second mask (not shown) having an opening is formed on insulating layer 58. Insulating layer 58 is partially etched using the second mask. Insulating layer 58 is selectively removed from second silicon layer 52, for example, by the method similar to that for insulating layer 56. Then, second silicon layer 52 is selectively etched using insulating layer 58 as a mask. Second silicon layer 52 is etched by deep reactive ion etching (DRIE). Insulating layer 55 functions as an etching stopper for etching second silicon layer 52. Then, the second mask is removed. Insulating layer 58 is removed. Insulating layer 58 is selectively removed from second silicon layer 52, for example, by the method similar to that for insulating layer 56. When insulating layer 58 is etched, insulating layer 55 exposed from second silicon layer 52 is also partially etched. The first mask is then removed.

Figure 20:
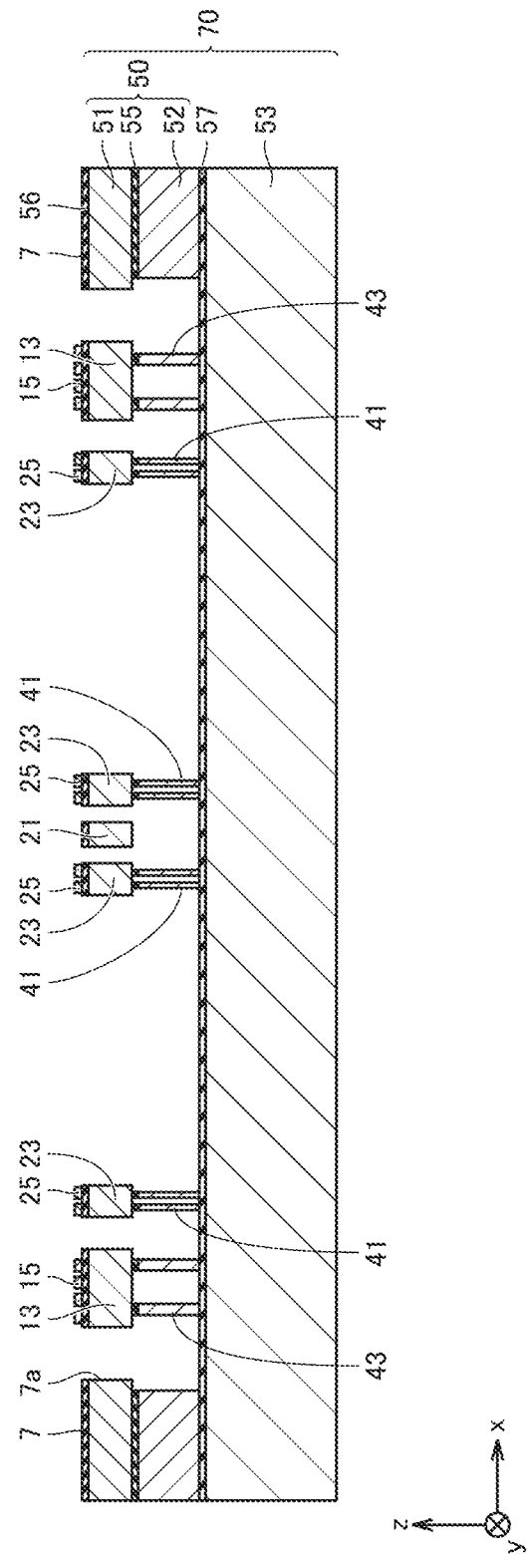
FIG. 20 is a schematic cross-sectional view showing a step subsequent to the steps shown in FIGS. 18 and 19 in the method of manufacturing the MEMS mirror device according to the first embodiment.
Figure 21:
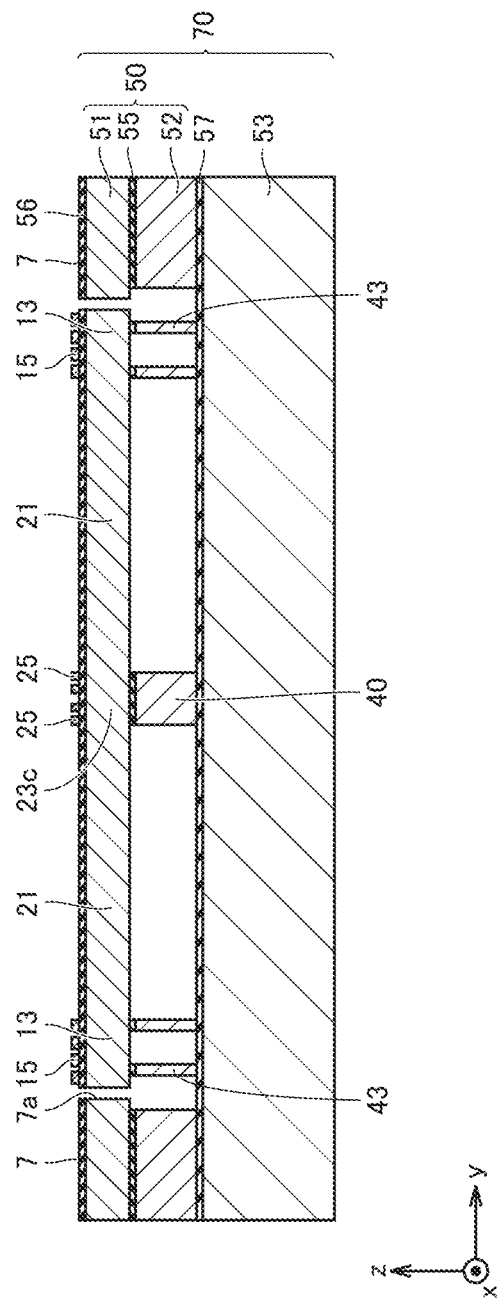
FIG. 21 is a schematic cross-sectional view showing a step subsequent to the steps shown in FIGS. 18 and 19 in the method of manufacturing the MEMS mirror device according to the first embodiment.

As shown in FIGS. 20 and 21, third silicon layer 53 is joined to second silicon layer 52 with insulating layer 57 interposed therebetween. Third silicon layer 53 is joined to coupling member 40 formed in second silicon layer 52. Third silicon layer 53 may be further joined to first rib 43, second ribs 41, 42, and a part of fixed frame body 7 that are formed in second silicon layer 52. Specifically, the rear surface of third silicon layer 53 is thermally oxidized to form insulating layer 57. Insulating layer 57 is a silicon dioxide ($SiO_2$) layer, for example. By the normal temperature activation joining technique or the plasma activation joining technique, third silicon layer 53 is joined to second silicon layer 52 with insulating layer 57 interposed therebetween. Third silicon layer 53 is joined to second silicon layer 52 at a temperature at which first coil 25 and second coil 15 are not damaged. This leads to formation of a stack 70 including first silicon layer 51, second silicon layer 52, and third silicon layer 53. Second silicon layer 52 is stacked between first silicon layer 51 and third silicon layer 53.

Third silicon layer 53 is joined to second silicon layer 52 under a reduced-pressure atmosphere lower than atmospheric pressure or at a temperature higher than the room temperature. Accordingly, when third silicon layer 53 is joined to second silicon layer 52, a pressure difference is more likely to occur between reflective surface 30r and rear surface 30s of reflective mirror member 30, and thus, reflective mirror member 30 is more likely to deform. When third silicon layer 53 is joined to second silicon layer 52, gap 45 provided in at least a part of second rib 41 functions as a gas passage. Gap 45 serves to reduce a pressure difference occurring between reflective surface 30r and rear surface 30s of reflective mirror member 30, thereby preventing reflective mirror member 30 from becoming deformed.

Figure 22:
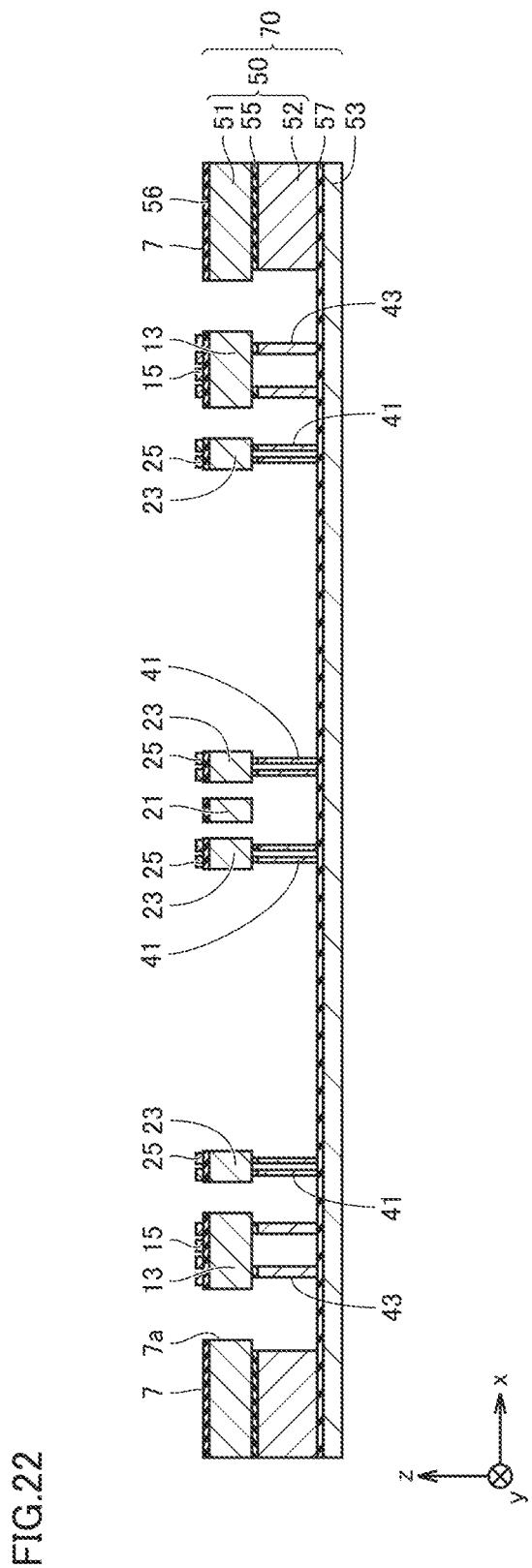
FIG. 22 is a schematic cross-sectional view showing a step subsequent to the step shown in FIG. 20 in the method of manufacturing the MEMS mirror device according to the first embodiment.
Figure 23:
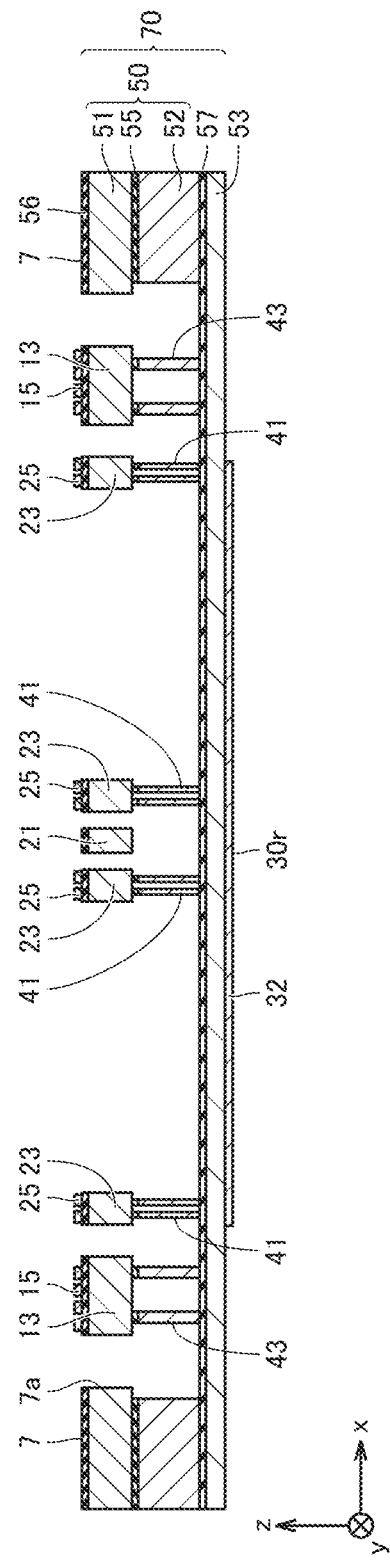
FIG. 23 is a schematic cross-sectional view showing a step subsequent to the step shown in FIG. 22 in the method of manufacturing the MEMS mirror device according to the first embodiment.

As shown in FIG. 22, third silicon layer 53 is thinned. For example, third silicon layer 53 may be polished by a chemical mechanical polishing technique. As shown in FIG. 23, reflective layer 32 is formed on the front surface of third silicon layer 53. For example, vapor deposition of a metal material having a high reflectivity such as gold, silver, or aluminum is conducted on the front surface of third silicon layer 53. The front surface of third silicon layer 53 is a surface distal from first silicon layer 51.

Figure 24:
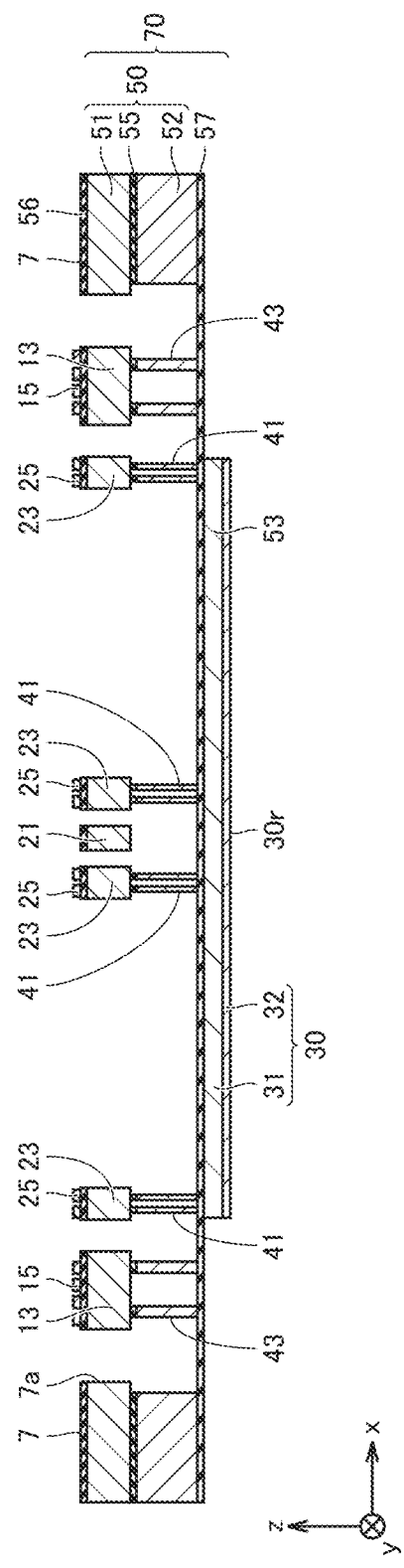
FIG. 24 is a schematic cross-sectional view showing a step subsequent to the step shown in FIG. 23 in the method of manufacturing the MEMS mirror device according to the first embodiment.

As shown in FIG. 24, a part of third silicon layer 53 is removed. Such a part of third silicon layer 53 is a part of third silicon layer 53 around reflective layer 32, for example. Specifically, a mask (not shown) is formed on reflective layer 32. Then, third silicon layer 53 is partially etched by reactive ion etching (RIE). Insulating layer 57 functions as an etching stopper for etching third silicon layer 53. Then, insulating layer 57 around reflective layer 32 is removed. Reflective mirror member 30 is formed in third silicon layer 53. Thus, MEMS mirror device 3 shown in FIGS. 2 to 9 is obtained.

The following describes the effects of MEMS mirror device 3 and the method of manufacturing MEMS mirror device 3 according to the present embodiment.

A MEMS mirror device 3 of the present embodiment includes: a frame body (outer movable frame body 13); an inner movable member 23; a first beam 21; a reflective mirror member 30; and a coupling member 40. Inner movable member 23 is disposed inside the frame body. First beam 21 couples inner movable member 23 rotatably to the frame body. Reflective mirror member 30 has a reflective surface 30r and a rear surface 30s opposite to reflective surface 30r. Coupling member 40 couples reflective mirror member 30 and inner movable member 23. First beam 21 is coupled to inner movable member 23 at rear surface 30s of reflective mirror member 30.

In MEMS mirror device 3 of the present embodiment, first beam 21 is coupled to inner movable member 23 at rear surface 30s of reflective mirror member 30. Thus, the area of reflective surface 30r can be ensured without increasing the size of inner movable member 23. MEMS mirror device 3 may be reduced in size. Further, first beam 21 can be increased in length. In MEMS mirror device 3, even when the optical scanning angle is increased, occurrence of the hard spring effect can be suppressed.

MEMS mirror device 3 of the present embodiment further includes a fixed frame body 7 and a second beam 11. Second beam 11 couples the frame body rotatably to fixed frame body 7. The frame body is an outer movable frame body 13. In a plan view of reflective surface 30r of reflective mirror member 30, second beam 11 extends in a direction different from a direction in which first beam 21 extends. Thus, MEMS mirror device 3 can two-dimensionally scan the light incident upon reflective mirror member 30.

MEMS mirror device 3 of the present embodiment further includes a first rib 43 provided in outer movable frame body 13. First rib 43 protrudes from a surface of outer movable frame body 13, the surface of outer movable frame body 13 being located close to reflective mirror member 30, and first rib 43 is spaced apart from reflective mirror member 30. First rib 43 enhances the rigidity of outer movable frame body 13, to prevent outer movable frame body 13 from becoming distorted in its out-of-plane direction when outer movable frame body 13 rotationally vibrates about second beam 11. MEMS mirror device 3 may operate with low power consumption. In the present specification, the out-of-plane direction of outer movable frame body 13 means the thickness direction of outer movable frame body 13.

In MEMS mirror device 3 of the present embodiment, second beam 11 includes: a first layer 11a (first silicon layer 51) connected to the frame body (outer movable frame body 13) and fixed frame body 7; and a second layer 11b (second silicon layer 52) stacked on first layer 11a. Second layer 11b is separated from the frame body (outer movable frame body 13) and fixed frame body 7, and is greater in thickness and smaller in width than first layer 11a.

First layer 11a connected to the frame body (outer movable frame body 13) and fixed frame body 7 such that second beam 11 is torsionally displaced is designed to have low torsional rigidity. This reduces the out-of-plane rigidity of second beam 11. When MEMS mirror device 3 is used in an environment in which reflective mirror member 30 vibrates in the out-of-plane direction of reflective mirror member 30 as in an automobile, it is difficult to scan the light incident upon reflective mirror member 30 in an appropriate direction. In contrast, when second layer 11b greater in thickness and smaller in width than first layer 11a is stacked on first layer 11a as in the present embodiment, the out-of-plane rigidity of second beam 11 can be increased without significantly increasing the torsional rigidity of second beam 11. Thus, even when MEMS mirror device 3 is used in an environment in which reflective mirror member 30 vibrates in the out-of-plane direction of reflective mirror member 30, the light incident upon reflective mirror member 30 can be scanned in an appropriate direction. In the present specification, the out-of-plane rigidity of second beam 11 means the rigidity of second beam 11 along the thickness direction of reflective mirror member 30.

In MEMS mirror device 3 of the present embodiment, inner movable member 23 is provided with a slot 23s. First beam 21 extends through slot 23s. Thus, first beam 21 can be coupled to inner movable member 23 at rear surface 30s of reflective mirror member 30. The area of reflective surface 30r can be ensured without increasing the size of inner movable member 23. MEMS mirror device 3 may be reduced in size.

In MEMS mirror device 3 of the present embodiment, inner movable member 23 includes a first frame body portion 23a, a second frame body portion 23b, and a coupling portion 23c that couples first frame body portion 23a and second frame body portion 23b. First beam 21 is coupled to coupling portion 23c. Slot 23s is defined by first frame body portion 23a, second frame body portion 23b, and coupling portion 23c. Since inner movable member 23 includes first frame body portion 23a and second frame body portion 23b, inner movable member 23 may be reduced in weight while ensuring the rigidity of inner movable member 23. MEMS mirror device 3 may operate at high speed with low power consumption.

MEMS mirror device 3 of the present embodiment further includes second ribs 41 and 42 provided in reflective mirror member 30. Second ribs 41 and 42 protrude from rear surface 30s of reflective mirror member 30. Second ribs 41 and 42 can increase the rigidity of reflective mirror member 30 without significantly increasing the weight of reflective mirror member 30. Second ribs 41 and 42 prevent reflective mirror member 30 from becoming distorted in its out-of-plane direction when reflective mirror member 30 rotationally vibrates. MEMS mirror device 3 can scan the light incident upon reflective mirror member 30 in an appropriate direction while increasing the optical scanning angle.

In MEMS mirror device 3 of the present embodiment, a gap 45 is provided in at least a part of second rib 41. Gap 45 allows fluid communication between the space surrounded by second rib 41 and the space outside second rib 41. Thus, gap 45 serves to reduce the pressure difference occurring between reflective surface 30r and rear surface 30s of reflective mirror member 30 during use of MEMS mirror device 3, thereby preventing reflective mirror member 30 from becoming deformed.

MEMS mirror device 3 of the present embodiment has a stack structure including a first silicon layer 51, a second silicon layer 52, and a third silicon layer 53. Second silicon layer 52 is stacked between first silicon layer 51 and third silicon layer 53. The frame body (outer movable frame body 13), inner movable member 23, and first beam 21 are formed in first silicon layer 51. Coupling member 40 is formed in second silicon layer 52. Reflective mirror member 30 is formed in third silicon layer 53. Thus, the area of reflective surface 30r can be ensured without increasing the size of inner movable member 23. MEMS mirror device 3 may be reduced in size.

A method of manufacturing MEMS mirror device 3 of the present embodiment is a method of manufacturing MEMS mirror device 3 having a stack 70 including a first silicon layer 51, a second silicon layer 52, and a third silicon layer 53, in which second silicon layer 52 is stacked between first silicon layer 51 and third silicon layer 53. The method of manufacturing MEMS mirror device 3 of the present embodiment further includes: forming inner movable member 23, the frame body (outer movable frame body 13), and first beam 21 in first silicon layer 51; forming coupling member 40 in second silicon layer 52; and forming reflective mirror member 30 in third silicon layer 53.

According to the method of manufacturing MEMS mirror device 3 of the present embodiment, MEMS mirror device 3 reduced in size can be manufactured. The yield of MEMS mirror device 3 from first SOI wafer 50 can be improved.

A method of manufacturing MEMS mirror device 3 of the present embodiment includes forming a stack 70 including a first silicon layer 51, a second silicon layer 52, and a third silicon layer 53. Second silicon layer 52 is stacked between first silicon layer 51 and third silicon layer 53. The method of manufacturing MEMS mirror device 3 of the present embodiment further includes: forming inner movable member 23, the frame body (outer movable frame body 13), first beam 21, fixed frame body 7, and second beam 11 in first silicon layer 51; forming coupling member 40 in second silicon layer 52; and forming reflective mirror member 30 in third silicon layer 53. The frame body is outer movable frame body 13.

According to the method of manufacturing MEMS mirror device 3 of the present embodiment, MEMS mirror device 3 reduced in size can be manufactured. The yield of MEMS mirror device 3 from first SOI wafer 50 can be improved.

According to the method of manufacturing MEMS mirror device 3 of the present embodiment, each of first silicon layer 51 and second silicon layer 52 of first SOI wafer 50 is partially removed to form the frame body (outer movable frame body 13), inner movable member 23, and first beam 21 in first silicon layer 51, and to form coupling member 40 in second silicon layer 52. First SOI wafer 50 includes first silicon layer 51, a first insulating layer (insulating layer 55), and second silicon layer 52. First silicon layer 51 and second silicon layer 52 are stacked on one another with the first insulating layer (insulating layer 55) interposed therebetween. Third silicon layer 53 is joined to coupling member 40 to form stack 70. Third silicon layer 53 is partially removed to form reflective mirror member 30 in third silicon layer 53.

According to the method of manufacturing MEMS mirror device 3 of the present embodiment, MEMS mirror device 3 reduced in size can be manufactured. The yield of MEMS mirror device 3 from first SOI wafer 50 can be improved.

Second Embodiment

Figure 25:
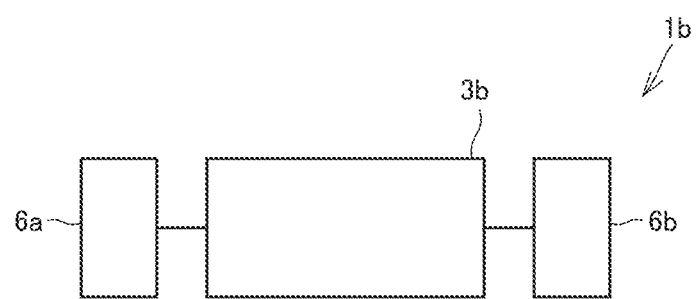
FIG. 25 is a schematic diagram of an optical scanning apparatus according to the second embodiment.

Referring to FIG. 25, an optical scanning apparatus 1b according to the second embodiment will be hereinafter described. Optical scanning apparatus 1b includes a MEMS mirror device 3b in place of MEMS mirror device 3 of the first embodiment. Optical scanning apparatus 1b includes a first AC voltage source 6a and a second AC voltage source 6b in place of first magnetic field generator 5a, second magnetic field generator 5b, first AC current source 5c, and second AC current source 5d in the first embodiment. In other words, optical scanning apparatus 1b includes MEMS mirror device 3b, first AC voltage source 6a, and second AC voltage source 6b. First AC voltage source 6a and second AC voltage source 6b function as a drive unit of MEMS mirror device 3b.

First AC voltage source 6a is configured to supply a first AC current between a first movable interdigitated electrode 71a and a first fixed interdigitated electrode 72a, each of which will be described later. Second AC voltage source 6b is configured to supply a second AC current between a second movable interdigitated electrode 71b and a second fixed interdigitated electrode 72b, each of which will be described later.

Figure 26:
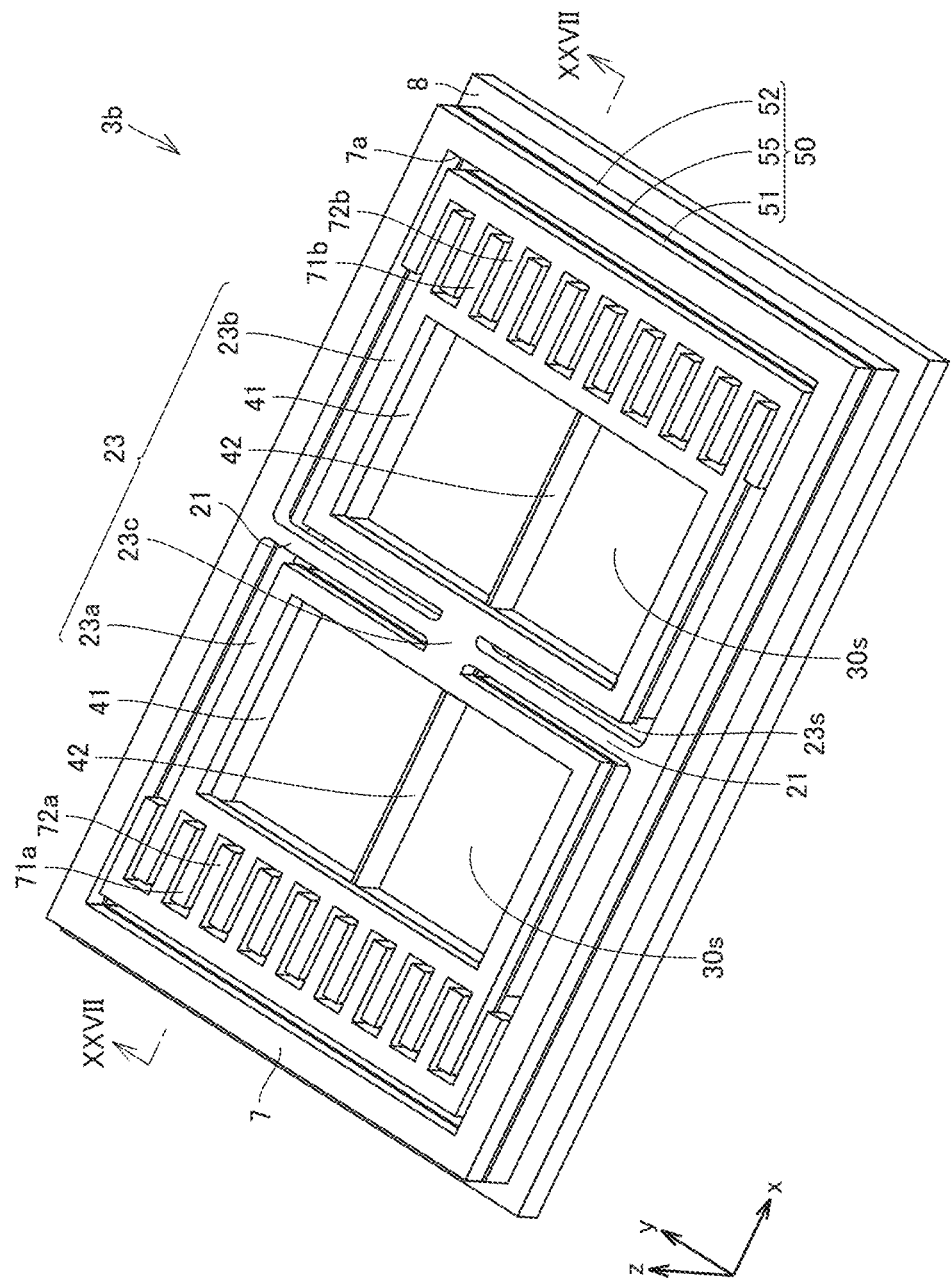
FIG. 26 is a schematic rear perspective view of a MEMS mirror device according to the second embodiment.
Figure 27:
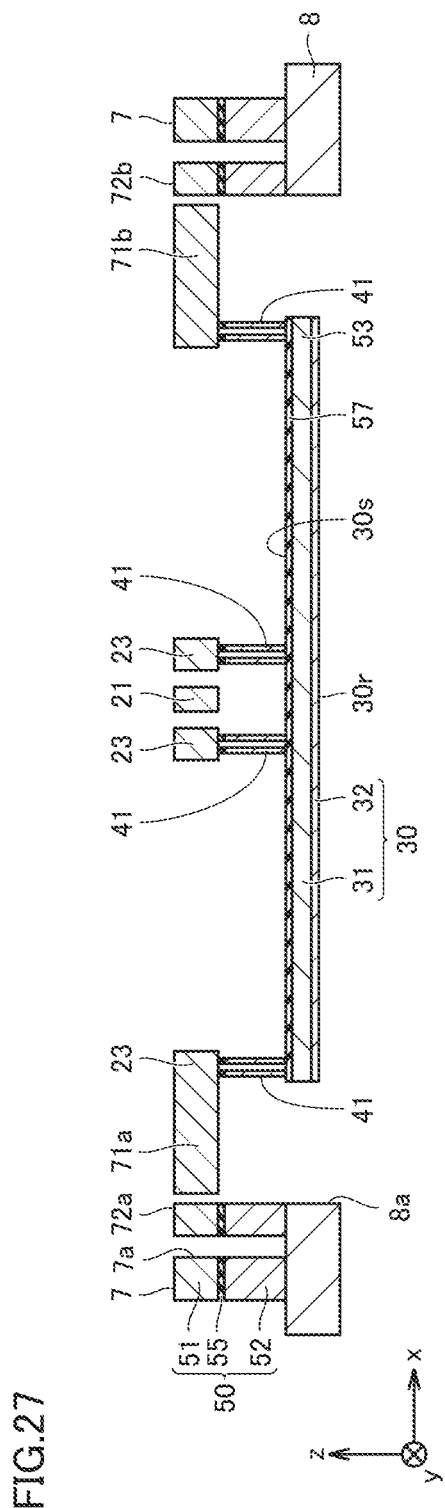
FIG. 27 is a schematic cross-sectional view of the MEMS mirror device according to the second embodiment, which is taken along a section line XXVII-XXVII shown in FIG. 26.

Then, MEMS mirror device 3b will be described with reference to FIGS. 26 and 27. MEMS mirror device 3b has the same configuration as that of MEMS mirror device 3 of the first embodiment, mainly except for the following points.

MEMS mirror device 3b does not include outer movable frame body 13, second beam 11, first coil 25, and second coil 15 of the first embodiment. MEMS mirror device 3b may not include insulating layer 56 of the first embodiment. The frame body is a fixed frame body 7. First beam 21 couples inner movable member 23 rotatably to the frame body (fixed frame body 7).

Inner movable member 23 includes first movable interdigitated electrode 71a and second movable interdigitated electrode 71b. First movable interdigitated electrode 71a is provided in first frame body portion 23a. Specifically, first movable interdigitated electrode 71a is formed in a portion of first frame body portion 23a opposite to coupling portion 23c. Second movable interdigitated electrode 71b is provided in second frame body portion 23b. Specifically, second movable interdigitated electrode 71b is formed in a portion of second frame body portion 23b opposite to coupling portion 23c. As shown in FIG. 27, first movable interdigitated electrode 71a and second movable interdigitated electrode 71b each have a layered structure similar to that of inner movable member 23. First movable interdigitated electrode 71a and second movable interdigitated electrode 71b are formed in first silicon layer 51. First movable interdigitated electrode 71a and second movable interdigitated electrode 71b each include an insulating layer 55.

MEMS mirror device 3b further includes first fixed interdigitated electrode 72a and second fixed interdigitated electrode 72b. First fixed interdigitated electrode 72a is disposed between fixed frame body 7 and first movable interdigitated electrode 71a. First fixed interdigitated electrode 72a faces first movable interdigitated electrode 71a. Second fixed interdigitated electrode 72b is disposed between fixed frame body 7 and second movable interdigitated electrode 71b. Second fixed interdigitated electrode 72b faces second movable interdigitated electrode 71b. As shown in FIG. 27, first fixed interdigitated electrode 72a and second fixed interdigitated electrode 72b each have a layered structure similar to that of fixed frame body 7. First fixed interdigitated electrode 72a and second fixed interdigitated electrode 72b are formed in first silicon layer 51 and second silicon layer 52. First fixed interdigitated electrode 72a and second fixed interdigitated electrode 72b each include insulating layer 55.

The operation of MEMS mirror device 3b will be hereinafter described.

First AC voltage source 6a supplies a first AC voltage between first movable interdigitated electrode 71a and first fixed interdigitated electrode 72a. The first frequency of the first AC voltage is set to half the resonance frequency of inner movable member 23. The first AC voltage generates first electrostatic force between first movable interdigitated electrode 71a and first fixed interdigitated electrode 72a. Second AC voltage source 6b supplies a second AC voltage between second movable interdigitated electrode 71b and second fixed interdigitated electrode 72b. The second frequency of the second AC voltage is set to half the resonance frequency of outer movable frame body 13. The second AC voltage generates second electrostatic force between second movable interdigitated electrode 71b and second fixed interdigitated electrode 72b.

The second AC voltage is opposite in phase to the first AC voltage. Thus, when the first AC voltage generates first electrostatic force as attractive force between first movable interdigitated electrode 71a and first fixed interdigitated electrode 72a, the second AC voltage generates second electrostatic force as repulsive force between second movable interdigitated electrode 71b and second fixed interdigitated electrode 72b. When the first AC voltage generates first electrostatic force as repulsive force between first movable interdigitated electrode 71a and first fixed interdigitated electrode 72a, the second AC voltage generates second electrostatic force as attractive force between second movable interdigitated electrode 71b and second fixed interdigitated electrode 72b. Thus, inner movable member 23 vibrates rotationally about first beam 21. Reflective mirror member 30 that vibrates rotationally scans, in the first direction (the x direction), the light incident upon reflective mirror member 30 from opening 8a of package 8 and opening 7a of fixed frame body 7. Thereby, optical scanning apparatus 1b one-dimensionally scans the light incident upon reflective mirror member 30.

As described above, each of the first frequency of the first AC voltage and the second frequency of the second AC voltage is set to half the resonance frequency of inner movable member 23, and the second AC voltage is opposite in phase to the first AC voltage. Inner movable member 23 vibrates rotationally about first beam 21 at the resonance frequency of inner movable member 23. Thus, the deflection angle of reflective mirror member 30 can be increased with a relatively small first AC current and a relatively small second AC voltage, and also, reflective mirror member 30 can be operated at high speed.

The method of manufacturing MEMS mirror device 3b of the present embodiment includes the same steps as those in the method of manufacturing MEMS mirror device 3 of the first embodiment, mainly except for the following points. First movable interdigitated electrode 71a and second movable interdigitated electrode 71b are obtained by the same steps as those for inner movable member 23. First fixed interdigitated electrode 72a and second fixed interdigitated electrode 72b are obtained by the same steps as those for fixed frame body 7. The method of manufacturing MEMS mirror device 3b according to the present embodiment does not include the step of forming first coil 25 and second coil 15 in the method of manufacturing MEMS mirror device 3 according to the first embodiment.

MEMS mirror device 3b and the method of manufacturing MEMS mirror device 3b according to the present embodiment achieve the following effects similar to those achieved by MEMS mirror device 3 and the method of manufacturing MEMS mirror device 3 according to the first embodiment. In MEMS mirror device 3b, first beam 21 is coupled to inner movable member 23 at rear surface 30s of reflective mirror member 30. Thus, the area of reflective surface 30r can be ensured without increasing the size of inner movable member 23. MEMS mirror device 3b may be reduced in size. Further, first beam 21 can be increased in length. In MEMS mirror device 3b, even when the optical scanning angle is increased, occurrence of the hard spring effect can be suppressed. According to the method of manufacturing MEMS mirror device 3b of the present embodiment, the yield of MEMS mirror device 3 from first SOI wafer 50 can be improved.

Third Embodiment

The following describes a method of manufacturing a MEMS mirror device 3 according to the third embodiment with reference to FIGS. 15, 22 to 24, and 28 to 34. The method of manufacturing MEMS mirror device 3 according to the present embodiment includes the same steps as those in the method of manufacturing MEMS mirror device 3 according to the first embodiment, mainly except for the following points.

Figure 28:
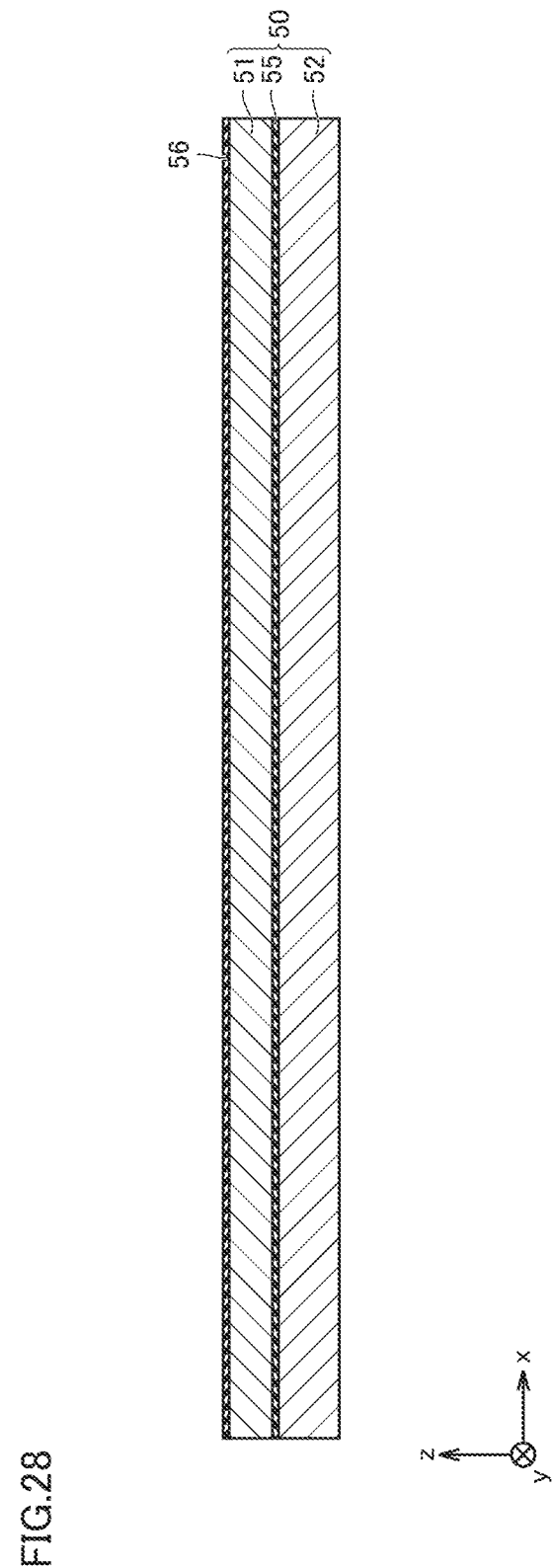
FIG. 28 is a schematic cross-sectional view showing a step subsequent to the step shown in FIG. 15 in a method of manufacturing a MEMS mirror device according to the third embodiment.
Figure 29:
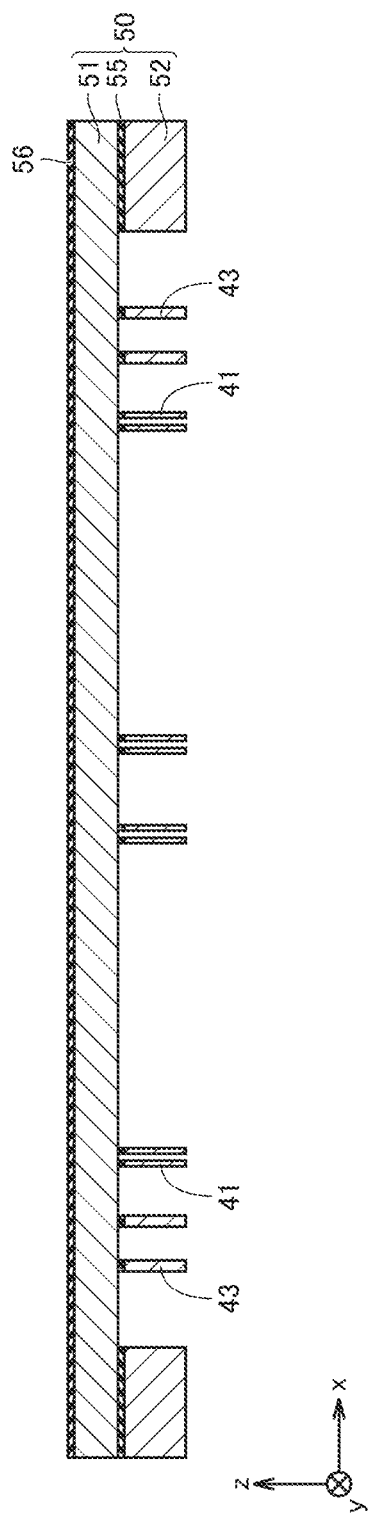
FIG. 29 is a schematic cross-sectional view showing a step subsequent to the step shown in FIG. 28 in the method of manufacturing the MEMS mirror device according to the third embodiment.
Figure 30:
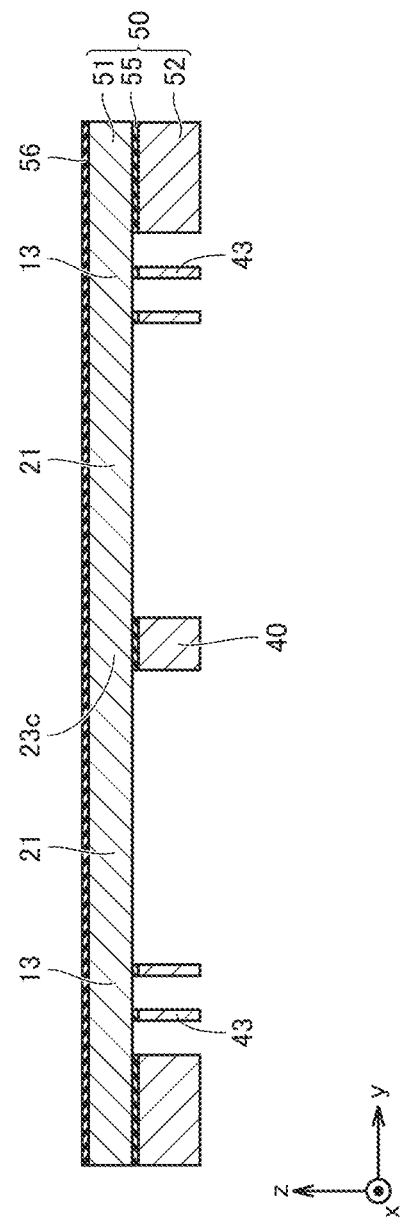
FIG. 30 is a schematic cross-sectional view showing a step subsequent to the step shown in FIG. 28 in the method of manufacturing the MEMS mirror device according to the third embodiment.

After the step shown in FIG. 15 in the first embodiment, insulating layer 58 is removed as shown in FIG. 28. Then, as shown in FIGS. 29 and 30, second silicon layer 52 is partially removed to form coupling member 40, first rib 43, second ribs 41 and 42, and a part of fixed frame body 7 in second silicon layer 52. Second silicon layer 52 is etched by deep reactive ion etching (DRIE). Insulating layer 55 functions as an etching stopper for etching second silicon layer 52.

Figure 31:
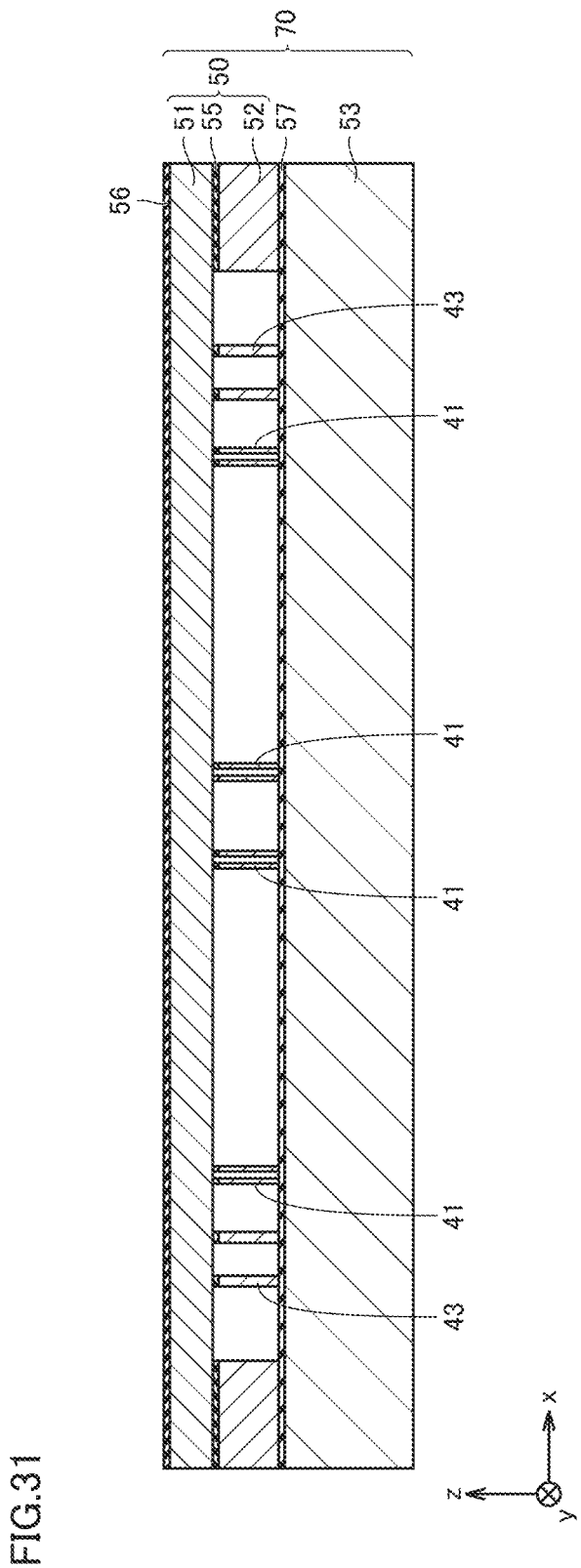
FIG. 31 is a schematic cross-sectional view showing a step subsequent to the steps shown in FIGS. 29 and 30 in the method of manufacturing the MEMS mirror device according to the third embodiment.
Figure 32:
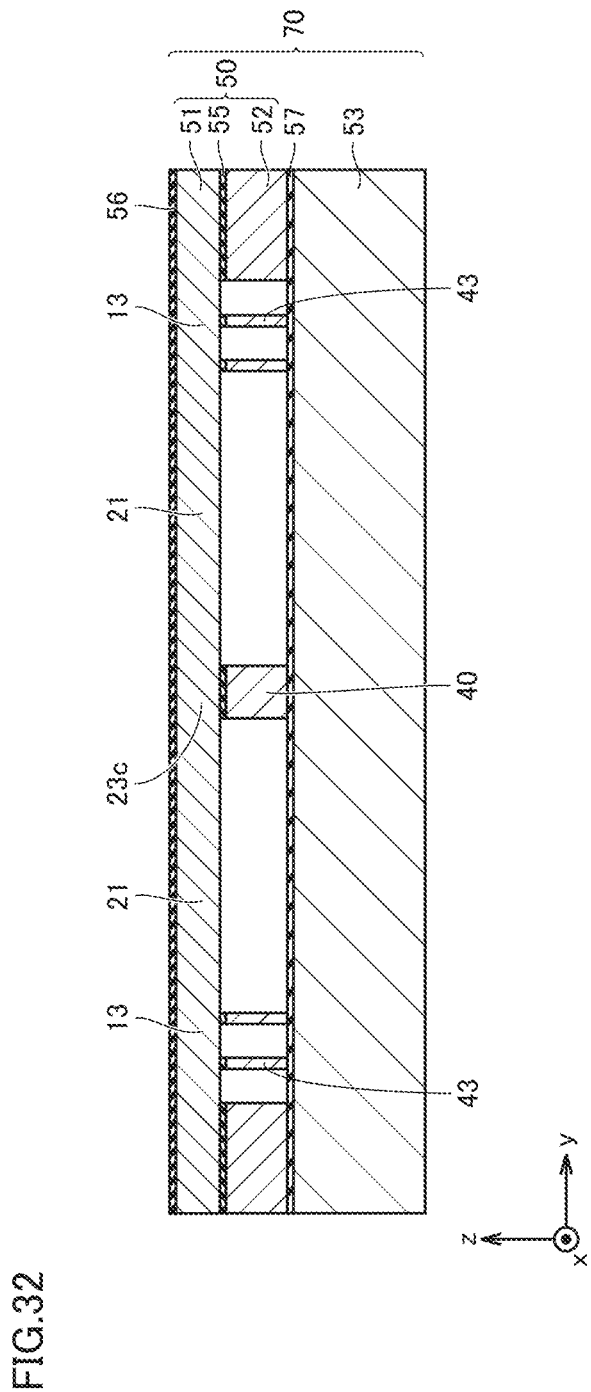
FIG. 32 is a schematic cross-sectional view showing a step subsequent to the steps shown in FIGS. 29 and 30 in the method of manufacturing the MEMS mirror device according to the third embodiment.

As shown in FIGS. 31 and 32, third silicon layer 53 is joined to second silicon layer 52 with insulating layer 57 interposed therebetween. Third silicon layer 53 is joined to coupling member 40 formed in second silicon layer 52. Third silicon layer 53 may be further joined to first rib 43, second ribs 41, 42, and a part of fixed frame body 7 that are formed in second silicon layer 52. Specifically, the rear surface of third silicon layer 53 is thermally oxidized to form insulating layer 57. Third silicon layer 53 is joined to second silicon layer 52 with insulating layer 57 interposed therebetween. Thus, stack 70 including first silicon layer 51, second silicon layer 52, and third silicon layer 53 is formed. Second silicon layer 52 is stacked between first silicon layer 51 and third silicon layer 53.

Figure 33:
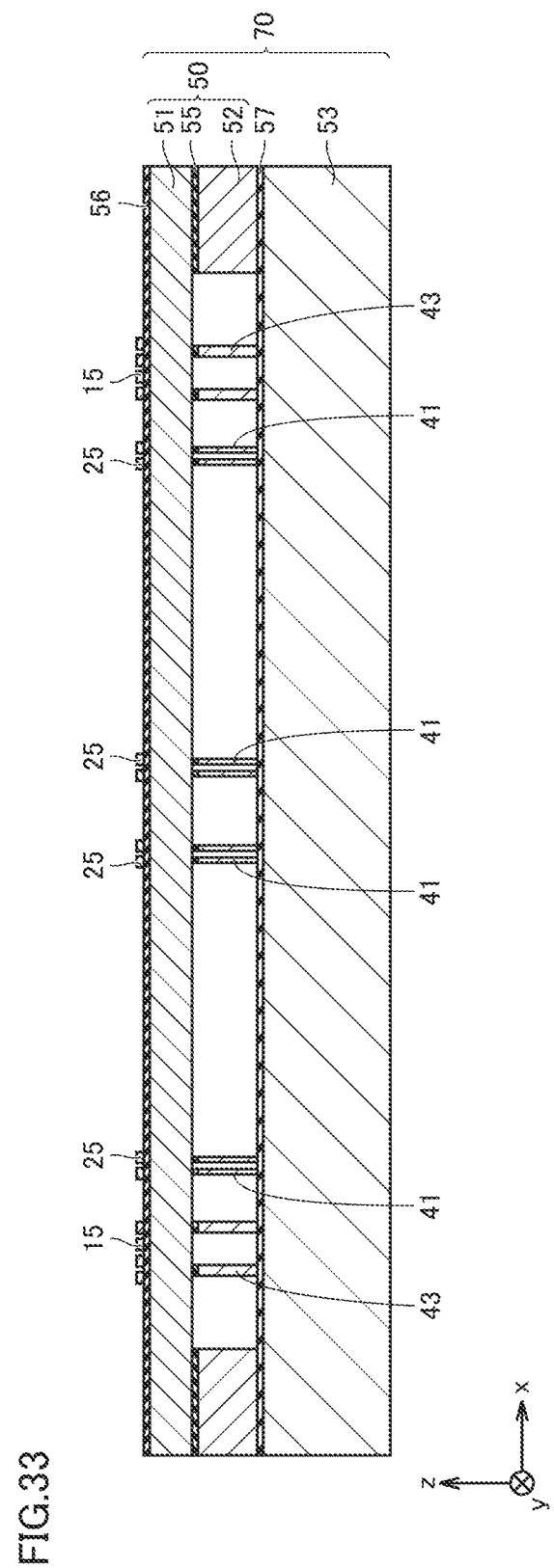
FIG. 33 is a schematic cross-sectional view showing a step subsequent to the steps shown in FIGS. 31 and 32 in the method of manufacturing the MEMS mirror device according to the third embodiment.

As shown in FIG. 33, after third silicon layer 53 is joined to coupling member 40, a first coil 25 and a second coil 15 are provided on insulating layer 56. First coil 25 and second coil 15 are formed by vapor deposition of a conductive material such as copper, gold, silver, or aluminum on insulating layer 56. Insulating layer 56 electrically insulates first coil 25 and second coil 15 from first silicon layer 51.

Figure 34:
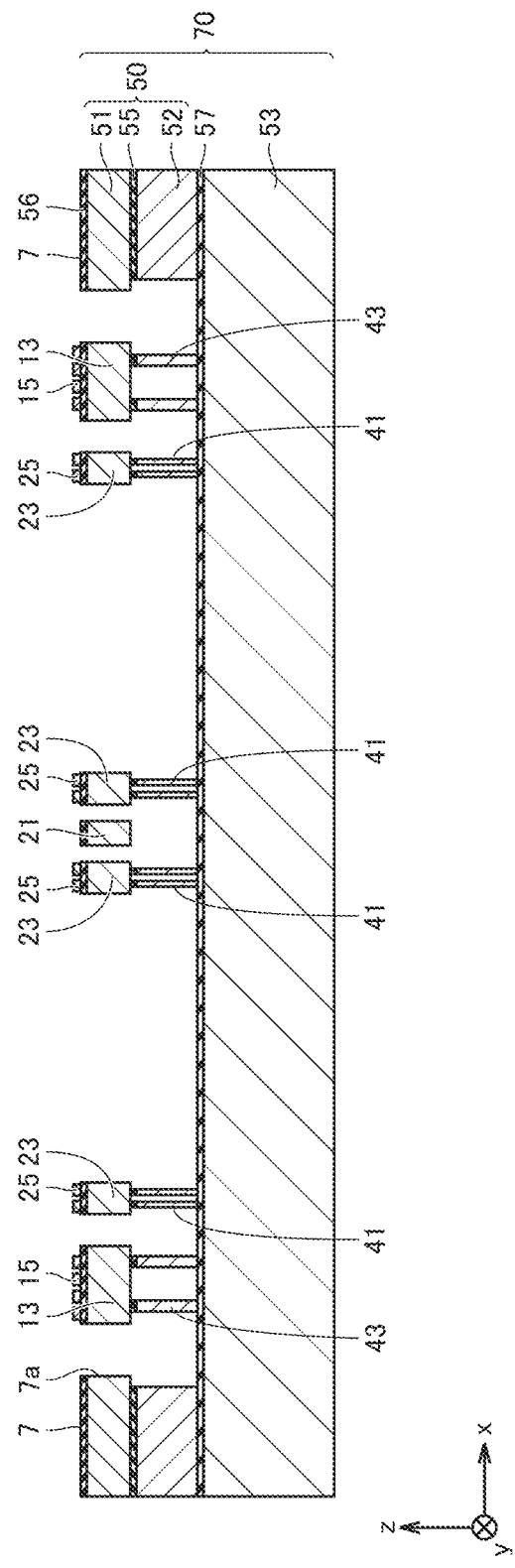
FIG. 34 is a schematic cross-sectional view showing a step subsequent to the step shown in FIG. 33 in the method of manufacturing the MEMS mirror device according to the third embodiment.

As shown in FIG. 34, insulating layer 55, insulating layer 56, and first silicon layer 51 each are partially removed to form inner movable member 23, the frame body (outer movable frame body 13), first beam 21, second beam 11, and a part of fixed frame body 7 in first silicon layer 51. Specifically, a mask (not shown) having an opening is formed on insulating layer 56, first coil 25, and second coil 15. Insulating layer 56 is partially etched using this mask. First silicon layer 51 is selectively etched using insulating layer 56 as a mask. First silicon layer 51 is etched by deep reactive ion etching (DRIE). Insulating layer 55 functions as an etching stopper for DRIE. Then, insulating layer 55 exposed from the mask is partially etched using the mask provided on insulating layer 56. The mask provided on insulating layer 56 is then removed.

Then, reflective mirror member 30 is formed in third silicon layer 53 by the steps shown in FIGS. 22 to 24 of the first embodiment. Thus, MEMS mirror device 3 shown in FIGS. 2 to 9 is obtained. The method of manufacturing MEMS mirror device 3 of the present embodiment may be employed also for manufacturing MEMS mirror device 3 of the second embodiment.

The method of manufacturing MEMS mirror device 3 of the present embodiment achieves the following effects similar to those achieved by the method of manufacturing MEMS mirror device 3 of the first embodiment.

According to the method of manufacturing MEMS mirror device 3 of the present embodiment, second silicon layer 52 of first SOI wafer 50 is partially removed to form a coupling member 40 in second silicon layer 52. First SOI wafer 50 includes first silicon layer 51, a first insulating layer (insulating layer 55), and second silicon layer 52. First silicon layer 51 and second silicon layer 52 are stacked on one another with the first insulating layer (insulating layer 55) interposed therebetween. Third silicon layer 53 is joined to coupling member 40 to form stack 70. First silicon layer 51 of stack 70 is partially removed to form the frame body (outer movable frame body 13), inner movable member 23, and first beam 21 in first silicon layer 51. Third silicon layer 53 is partially removed to form reflective mirror member 30 in third silicon layer 53.

According to the method of manufacturing MEMS mirror device 3 of the present embodiment, MEMS mirror device 3 reduced in size can be manufactured. The yield of MEMS mirror device 3 from first SOI wafer 50 can be improved.

The method of manufacturing MEMS mirror device 3 of the present embodiment further includes, after joining third silicon layer 53 to coupling member 40, forming a coil layer (first coil 25, second coil 15) on first silicon layer 51 with an insulating layer interposed therebetween. Thus, in order to join third silicon layer 53 to second silicon layer 52, a joining process performed at a temperature higher than that employed in the normal temperature activation joining technique or the plasma activation joining technique (for example, about 1000° C.) can be employed. Such a high temperature joining process may be implemented in a heating furnace that is commonly used in a semiconductor manufacturing process. According to the method of manufacturing MEMS mirror device 3 of the present embodiment, third silicon layer 53 can be joined to second silicon layer 52 more inexpensively and more firmly.

Fourth Embodiment

The following describes a method of manufacturing MEMS mirror device 3 according to the fourth embodiment with reference to FIGS. 15 to 19, 23, 24, and 35 to 37. The method of manufacturing MEMS mirror device 3 of the present embodiment includes the same steps as those in the method of manufacturing MEMS mirror device 3 of the first embodiment, mainly except for the following points.

Figure 35:
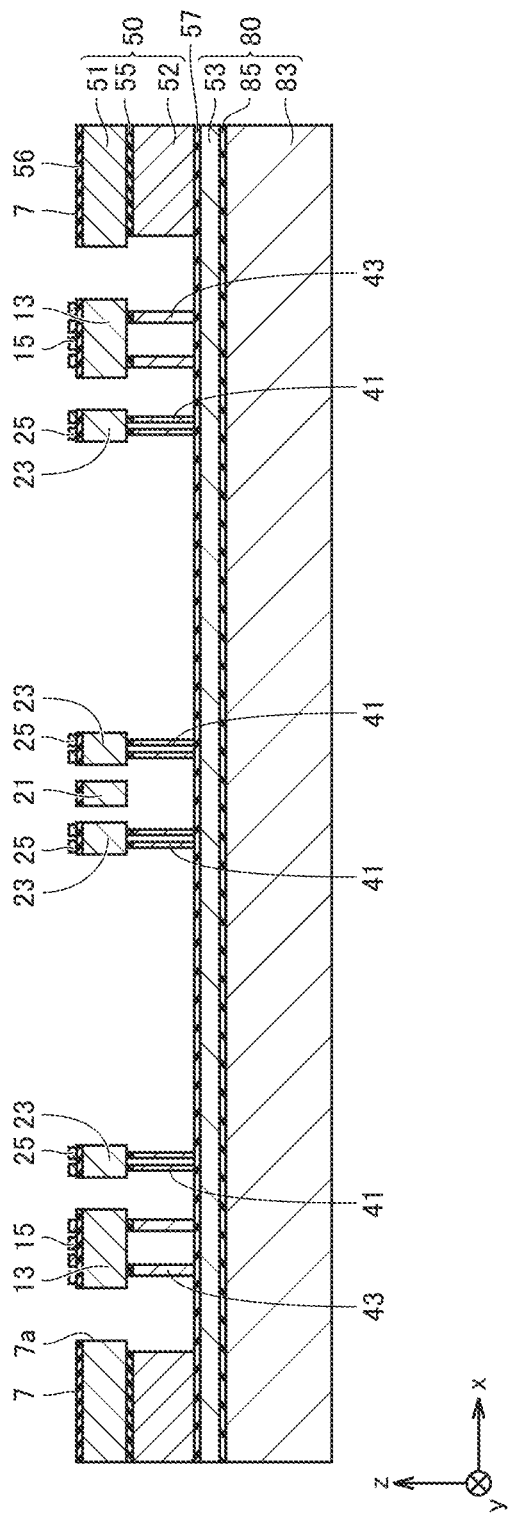
FIG. 35 is a schematic cross-sectional view showing a step subsequent to the steps shown in FIGS. 18 and 19 in a method of manufacturing a MEMS mirror device according to the fourth embodiment.
Figure 36:
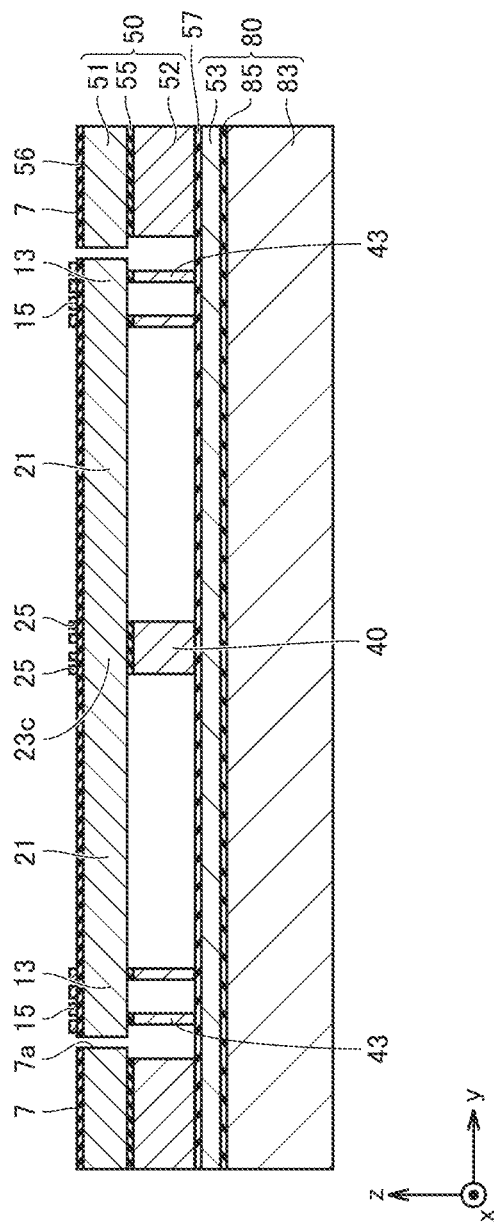
FIG. 36 is a schematic cross-sectional view showing a step subsequent to the steps shown in FIGS. 18 and 19 in the method of manufacturing the MEMS mirror device according to the fourth embodiment.

After the steps shown in FIGS. 15 to 19 of the first embodiment, a second SOI wafer 80 is joined to first SOI wafer 50 with insulating layer 57 interposed therebetween as shown in FIGS. 35 and 36. Second SOI wafer 80 includes a third silicon layer 53, an insulating layer 85, and a fourth silicon layer 83. Third silicon layer 53 and fourth silicon layer 83 are stacked on one another with insulating layer 85 interposed therebetween. Third silicon layer 53 is thinner than fourth silicon layer 83. Third silicon layer 53 is supported by fourth silicon layer 83. Insulating layer 85 is a silicon dioxide ($SiO_2$) layer, for example.

Second SOI wafer 80 (third silicon layer 53) is joined to coupling member 40 formed in second silicon layer 52. Second SOI wafer 80 (third silicon layer 53) may be further joined to first rib 43, second ribs 41, 42, and a part of fixed frame body 7 that are formed in second silicon layer 52. Specifically, the rear surface of third silicon layer 53 is thermally oxidized to form insulating layer 57. The rear surface of third silicon layer 53 is the surface of third silicon layer 53 that is distal from fourth silicon layer 83. By the normal temperature activation joining technique or the plasma activation joining technique, second SOI wafer 80 (third silicon layer 53) is joined to second silicon layer 52 with insulating layer 57 interposed therebetween. Second SOI wafer 80 (third silicon layer 53) is joined to second silicon layer 52 at a temperature at which first coil 25 and second coil 15 are not damaged.

Figure 37:
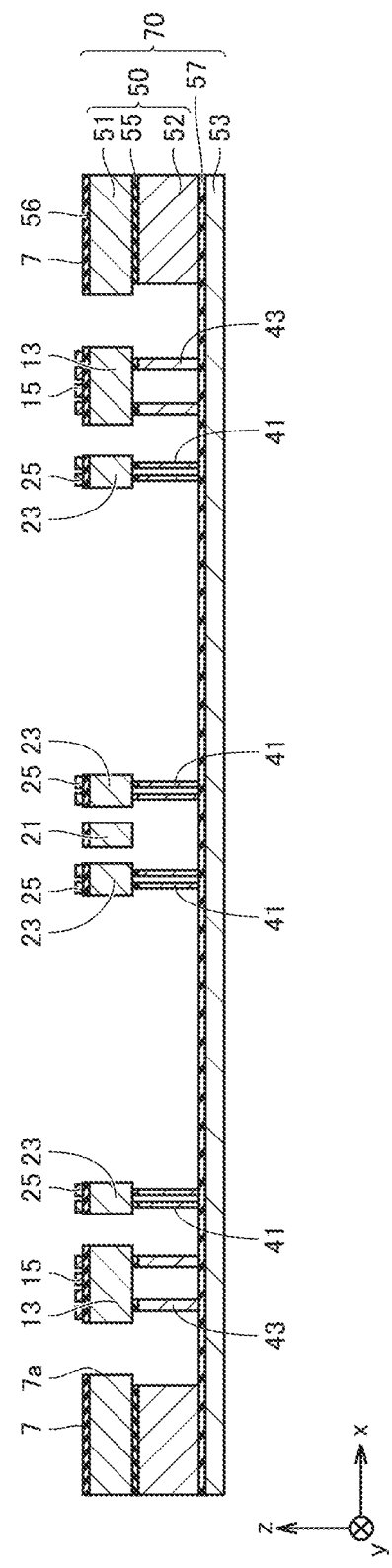
FIG. 37 is a schematic cross-sectional view showing a step subsequent to the steps shown in FIGS. 35 and 36 in the method of manufacturing the MEMS mirror device according to the fourth embodiment.

Referring to FIG. 37, fourth silicon layer 83 is etched to remove fourth silicon layer 83. Specifically, fourth silicon layer 83 may be dry-etched using etching gas such as $SF_6$ gas or $CF_4$ gas, or may be wet-etched using an etching solution such as potassium hydroxide (KOH), tetramethylammonium hydroxide (TMAH), or ethylenediamine pyrocatechol (EDP). Insulating layer 85 functions as an etching stopper for etching fourth silicon layer 83. Then, insulating layer 85 is removed. Thus, stack 70 including first silicon layer 51, second silicon layer 52, and third silicon layer 53 is formed. Second silicon layer 52 is stacked between first silicon layer 51 and third silicon layer 53.

Then, through the steps shown in FIGS. 23 and 24 of the first embodiment, reflective mirror member 30 is formed in third silicon layer 53. Thus, MEMS mirror device 3 shown in FIGS. 2 to 9 is obtained. The method of manufacturing MEMS mirror device 3 of the present embodiment may be employed also for manufacturing MEMS mirror device 3 of the second embodiment.

The method of manufacturing MEMS mirror device 3 of the present embodiment achieves the following effects similar to those achieved by the method of manufacturing MEMS mirror device 3 of the first embodiment.

In the method of manufacturing MEMS mirror device 3 of the present embodiment, each of first silicon layer 51 and second silicon layer 52 of first SOI wafer 50 is partially removed to form the frame body (outer movable frame body 13), inner movable member 23, and first beam 21 in first silicon layer 51, and to form coupling member 40 in second silicon layer 52. First SOI wafer 50 includes first silicon layer 51, a first insulating layer (insulating layer 55), and second silicon layer 52. First silicon layer 51 and second silicon layer 52 are stacked on one another with the first insulating layer (insulating layer 55) interposed therebetween. A second SOI wafer 80 is joined to coupling member 40 and a fourth silicon layer 83 is removed to form stack 70. Second SOI wafer 80 includes third silicon layer 53, a second insulating layer (insulating layer 85), and fourth silicon layer 83. Third silicon layer 53 and fourth silicon layer 83 are stacked on one another with the second insulating layer (insulating layer 85) interposed therebetween. Third silicon layer 53 is partially removed to form reflective mirror member 30 in third silicon layer 53.

According to the method of manufacturing MEMS mirror device 3 of the present embodiment, MEMS mirror device 3 reduced in size can be manufactured. The yield of MEMS mirror device 3 from first SOI wafer 50 and second SOI wafer 80 can be improved.

In the method of manufacturing MEMS mirror device 3 of the present embodiment, the thickness of third silicon layer 53 is determined by the thickness of third silicon layer 53 included in second SOI wafer 80. The step of thinning third silicon layer 53, which is performed after joining third silicon layer 53 to second silicon layer 52, can be eliminated. The thickness of reflective mirror member 30 (third silicon layer 53) may be controlled with high accuracy. Thus, the quality of MEMS mirror device 3 can be stabilized.

In the method of manufacturing MEMS mirror device 3 according to the present embodiment, fourth silicon layer 83 is removed by etching in place of machining such as polishing. Thus, first rib 43, second ribs 41, 42 and the like are prevented from being damaged when fourth silicon layer 83 is removed. MEMS mirror device 3 can be manufactured at an improved yield.

It should be understood that the first to forth embodiments disclosed herein are illustrative and non-restrictive in every respect. At least two of the first to fourth embodiments disclosed herein may be combined together as long as there is no inconsistency. For example, the drive unit of the MEMS mirror device of the first embodiment may be replaced with the drive unit of the MEMS mirror device of the second embodiment. The scope of the present invention is defined by the terms of the claims, rather than the description above, and is intended to include any modifications within the meaning and scope equivalent to the terms of the claims.

REFERENCE SIGNS LIST 1, 1b optical scanning apparatus, 3, 3b MEMS mirror device, 5a first magnetic field generator, 5b second magnetic field generator, 5c first AC current source, 5d second AC current source, 6a first AC voltage source, 6b second AC voltage source, 7 fixed frame body, 7a opening, 8 package, 8a opening, 11 second beam, 11a first layer, 11b second layer, 13 outer movable frame body, 15 second coil, 21 first beam, 23 inner movable member, 23a first frame body portion, 23b second frame body portion, 23c coupling portion, 23s slot, 25 first coil, 30 reflective mirror member, 30r reflective surface, 30s rear surface, 31 base member, 32 reflective layer, 40 coupling member, 41, 42 second rib, 43 first rib, 45 gap, 50 first SOI wafer, 51 first silicon layer, 52 second silicon layer, 53 third silicon layer, 55, 56, 57, 58, 85 insulating layer, 61 first magnetic field, 62 second magnetic field, 70 stack, 71a first movable interdigitated electrode, 71b second movable interdigitated electrode, 72a first fixed interdigitated electrode, 72b second fixed interdigitated electrode, 80 second SOI wafer, 83 fourth silicon layer.

The invention claimed is:

1. A MEMS mirror device comprising:
    a frame body;
    an inner movable member disposed inside the frame body;
    a first beam coupling the inner movable member rotatably to the frame body;
    a reflective mirror member having a reflective surface and a rear surface opposite to the reflective surface; and
    a coupling member coupling the reflective mirror member and the inner movable member, wherein
    the first beam is coupled to the inner movable member at the rear surface of the reflective mirror member,
    the inner movable member is provided with a slot,
    the first beam extends through the slot,
    the inner movable member includes
        a first frame body portion,
        a second frame body portion, and
        a coupling portion that couples the first frame body portion and the second frame body portion,
    the first beam is coupled to the coupling portion, and
    the slot is defined by the first frame body portion, the second frame body portion, and the coupling portion.

2. The MEMS mirror device according to claim 1, wherein the frame body is a fixed frame body.

3. The MEMS mirror device according to claim 1, further comprising a second rib provided in the reflective mirror member, wherein
    the second rib protrudes from the rear surface of the reflective mirror member.

4. The MEMS mirror device according to claim 3, wherein a gap is provided in at least a part of the second rib.

5. The MEMS mirror device according to claim 1, wherein
    the MEMS mirror device has a stack structure including a first silicon layer, a second silicon layer, and a third silicon layer,
    the second silicon layer is stacked between the first silicon layer and the third silicon layer,
    the frame body, the inner movable member, and the first beam are formed in the first silicon layer,
    the coupling member is formed in the second silicon layer, and
    the reflective mirror member is formed in the third silicon layer.

6. A method of manufacturing the MEMS mirror device according to claim 1, the MEMS mirror device having a stack including a first silicon layer, a second silicon layer, and a third silicon layer, the second silicon layer being stacked between the first silicon layer and the third silicon layer, the method comprising:
    forming the inner movable member, the frame body, and the first beam in the first silicon layer;
    forming the coupling member in the second silicon layer; and
    forming the reflective mirror member in the third silicon layer.

7. The method of manufacturing the MEMS mirror device according to claim 6, wherein
    each of the first silicon layer and the second silicon layer of a first SOI wafer is partially removed to form the frame body, the inner movable member, and the first beam in the first silicon layer, and to form the coupling member in the second silicon layer, the first SOI wafer includes the first silicon layer, a first insulating layer, and the second silicon layer, and the first silicon layer and the second silicon layer are stacked on one another with the first insulating layer interposed therebetween,
    the third silicon layer is joined to the coupling member to form the stack, and
    the third silicon layer is partially removed to form the reflective mirror member in the third silicon layer.

8. The method of manufacturing the MEMS mirror device according to claim 6, wherein
    the second silicon layer of a first SOI wafer is partially removed to form the coupling member in the second silicon layer, the first SOI wafer includes the first silicon layer, a first insulating layer, and the second silicon layer, and the first silicon layer and the second silicon layer are stacked on one another with the first insulating layer interposed therebetween,
    the third silicon layer is joined to the coupling member to form the stack,
    the first silicon layer of the stack is partially removed to form the frame body, the inner movable member, and the first beam in the first silicon layer, and
    the third silicon layer is partially removed to form the reflective mirror member in the third silicon layer.

9. The method of manufacturing the MEMS mirror device according to claim 8, further comprising, after joining the third silicon layer to the coupling member, forming a coil layer on the first silicon layer with an insulating layer interposed therebetween.

10. The method of manufacturing the MEMS mirror device according to claim 6, wherein
    each of the first silicon layer and the second silicon layer of a first SOI wafer is partially removed to form the frame body, the inner movable member, and the first beam in the first silicon layer, and to form the coupling member in the second silicon layer, the first SOI wafer includes the first silicon layer, a first insulating layer, and the second silicon layer, and the first silicon layer and the second silicon layer are stacked on one another with the first insulating layer interposed therebetween,
    a second SOI wafer is joined to the coupling member and a fourth silicon layer is removed to form the stack, the second SOI wafer includes the third silicon layer, a second insulating layer, and the fourth silicon layer, and the third silicon layer and the fourth silicon layer are stacked on one another with the second insulating layer interposed therebetween, and
    the third silicon layer is partially removed to form the reflective mirror member in the third silicon layer.

11. A MEMS mirror device comprising:
    a frame body;
    an inner movable member disposed inside the frame body;
    a first beam coupling the inner movable member rotatably to the frame body;
    a reflective mirror member having a reflective surface and a rear surface opposite to the reflective surface; and
    a coupling member coupling the reflective mirror member and the inner movable member,
    a fixed frame body; and
    a second beam coupling the frame body rotatably to the fixed frame body, wherein
    the first beam is coupled to the inner movable member at the rear surface of the reflective mirror member,
    the frame body is an outer movable frame body, in a plan view of the reflective surface of the reflective mirror member, the second beam extends in a direction different from a direction in which the first beam extends, the second beam includes
- a first layer connected to the frame body and the fixed frame body, and
- a second layer stacked on the first layer, and the second layer is separated from the frame body and the fixed frame body, and is greater in thickness and smaller in width than the first layer.

12. The MEMS mirror device according to claim 11, further comprising a first rib provided in the outer movable frame body, wherein the first rib protrudes from a surface of the outer movable frame body, the surface of the outer movable frame body being located close to the reflective mirror member, and the first rib is spaced apart from the reflective mirror member.

13. A method of manufacturing the MEMS mirror device according to claim 11, the MEMS mirror device having a stack including a first silicon layer, a second silicon layer, and a third silicon layer, the second silicon layer being stacked between the first silicon layer and the third silicon layer, the method comprising:

forming the inner movable member, the frame body, the first beam, the fixed frame body, and the second beam in the first silicon layer;

forming the coupling member in the second silicon layer; and forming the reflective mirror member in the third silicon layer, wherein the frame body is the outer movable frame body.

* * * * *